United States Patent
Shih et al.

(10) Patent No.: US 10,452,438 B2
(45) Date of Patent: *Oct. 22, 2019

(54) PARAMETER SELECTION FOR OPTIMIZATION OF TASK EXECUTION BASED ON EXECUTION HISTORY FOR PRIOR TASKS

(71) Applicant: Amazon Technologies, Inc., Seattle, WA (US)

(72) Inventors: Kathryn Marie Shih, Seattle, WA (US); Carl Louis Christofferson, Seattle, WA (US); Richard Jeffrey Cole, Seattle, WA (US); Peter Sirota, Seattle, WA (US); Vaibhav Aggarwal, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,162

(22) Filed: Jul. 31, 2017

(65) Prior Publication Data

US 2017/0357530 A1 Dec. 14, 2017

Related U.S. Application Data

(63) Continuation of application No. 13/764,708, filed on Feb. 11, 2013, now Pat. No. 9,720,732.

(51) Int. Cl.
*G06F 9/46* (2006.01)
*G06F 9/50* (2006.01)

(52) U.S. Cl.
CPC ..................................... *G06F 9/50* (2013.01)

(58) Field of Classification Search
None
See application file for complete search history.

(56) References Cited

U.S. PATENT DOCUMENTS

| | | | |
|---|---|---|---|
| 7,386,586 B1 | 6/2008 | Headley et al. | |
| 7,725,207 B1 | 5/2010 | Logsdon et al. | |
| 9,430,280 B1 | 8/2016 | Shih | |

(Continued)

FOREIGN PATENT DOCUMENTS

| | | |
|---|---|---|
| JP | H09198354 | 7/1997 |
| JP | 2003256222 | 9/2003 |
| WO | 2012027478 | 3/2012 |

OTHER PUBLICATIONS

Herodotou et al. ("Profiling, What-if Analysis, and Cost-based Optimization of Map Reduce Programs", Proceedings of the VLDB Endowment, vol. 4, No. 11, 2011).*

(Continued)

*Primary Examiner* — Wissam Rashid
(74) *Attorney, Agent, or Firm* — Robert C. Kowert; Meyertons Hood Kivlin Kowert & Goetzel, P.C.

(57) ABSTRACT

Methods and systems for optimization of task execution are disclosed. A definition of a task is received. A plurality of parameter values for execution of the task are selected based on an execution history for a plurality of prior tasks performed for a plurality of clients. The plurality of parameter values are selected to optimize one or more execution constraints for the execution of the task. The execution of the task is initiated using one or more computing resources configured with the selected parameter values.

22 Claims, 14 Drawing Sheets

(56) References Cited

U.S. PATENT DOCUMENTS

| | | | |
|---|---|---|---|
| 9,720,732 B1 | 8/2017 | Shih et al. | |
| 2005/0120095 A1* | 6/2005 | Aman | H04L 67/1008 |
| | | | 709/219 |
| 2007/0021998 A1 | 1/2007 | Laithwaite et al. | |
| 2011/0138055 A1 | 6/2011 | Daly et al. | |
| 2012/0131591 A1 | 5/2012 | Moorthi et al. | |
| 2012/0180055 A1 | 7/2012 | Brech et al. | |
| 2012/0252422 A1 | 10/2012 | Gupta | |
| 2013/0073724 A1 | 3/2013 | Parashar et al. | |
| 2013/0104140 A1* | 4/2013 | Meng | G06F 9/4881 |
| | | | 718/104 |
| 2013/0268941 A1* | 10/2013 | Cherkasova | G06F 9/5066 |
| | | | 718/104 |
| 2014/0229221 A1 | 8/2014 | Shih | |

OTHER PUBLICATIONS

Srigurunath Chakravarthi, "Tuning Hadoop for Performance," Mar. 5, 2010 pp. 1-29.

Herodotou, et al., "No One (Cluster) Size Fits All: Automatic Cluster Sizing for Data-intesive Analysis," SOCC'11, Oct. 27-28, 2011, Cascals, Portugal.

\* cited by examiner

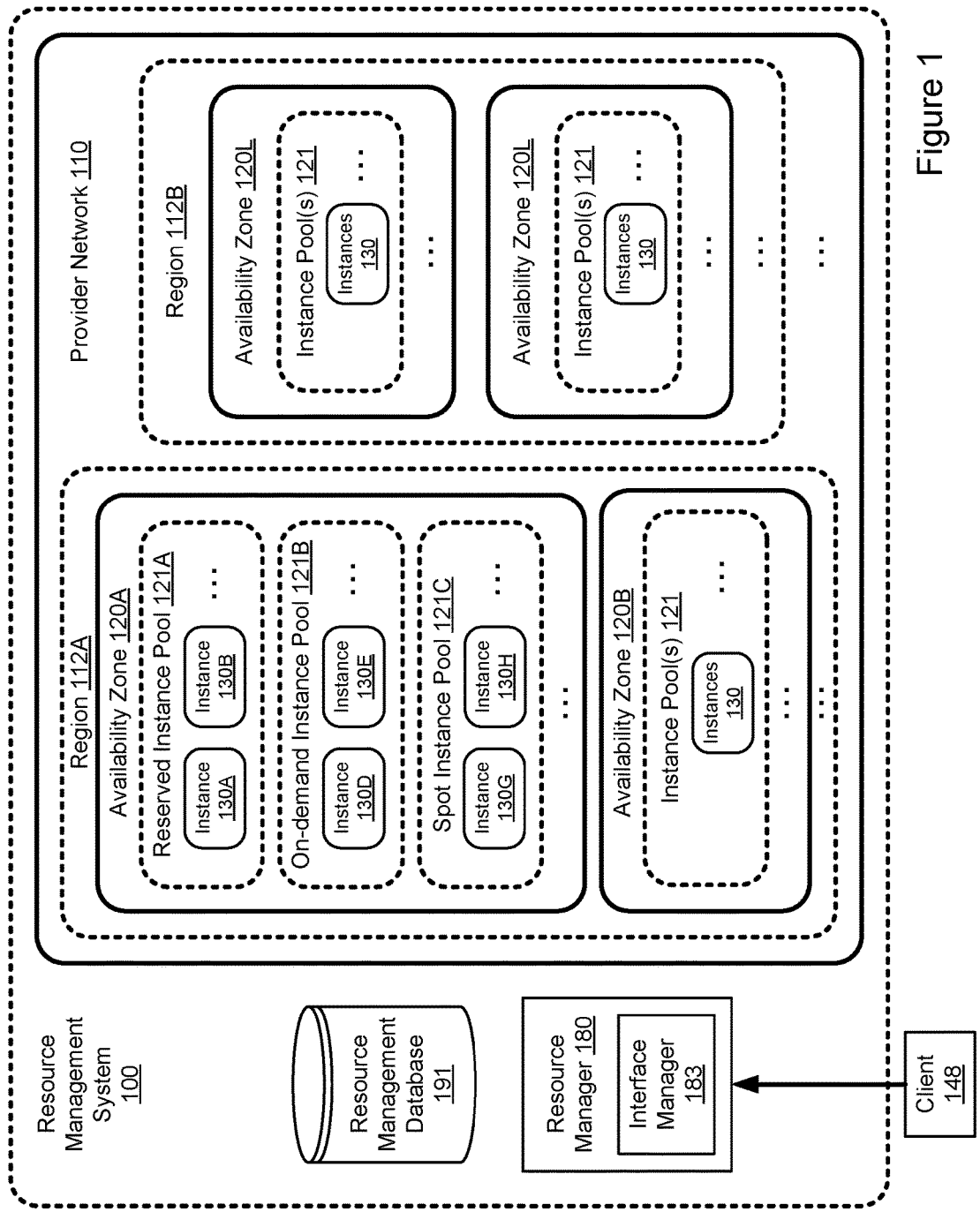

PARAMETER SELECTION FOR OPTIMIZATION OF TASK EXECUTION BASED ON EXECUTION HISTORY FOR PRIOR TASKS

This application is a continuation of U.S. patent application Ser. No. 13/764,708, filed Feb. 11, 2013, now U.S. Pat. No. 9,720,732, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, thus allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The provider network operator may seek to ensure that a number of potentially competing demands are met, e.g., that all guaranteed commitments to clients (such as long-term reservations that have already been paid for) are honored, that the dynamically-varying component of resource pricing does not get so high that customer satisfaction suffers, that the provider's data center investment is justified by a reasonable level of resource utilization and revenue, and so on. Depending on customer budgets, at least for certain types of typically long-running applications for which the major constraint is that the application should ideally be completed before some relatively distant deadline, some customers may be willing to allow the network provider operator flexibility in determining exactly which resources are deployed and when, especially in return for pricing benefits.

BRIEF DESCRIPTION OF THE DRAWINGS

FIG. 1 illustrates an example system environment for a resource management system, according to one embodiment.

Figure 2A:
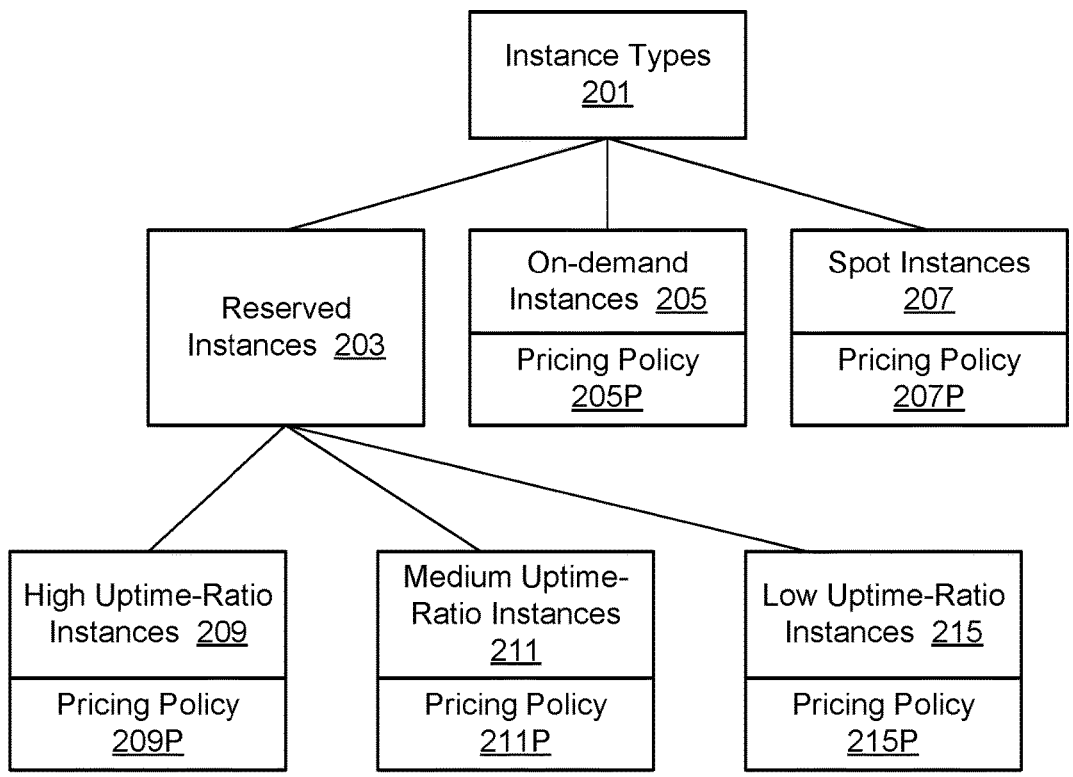
FIGS. 2a and 2b illustrate example resource instance classification approaches, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems associated with a resource management system are described. The resource management system may schedule and execute tasks using resources such as compute instances. In some embodiments, using the systems and methods described herein, a task may be scheduled to finish prior to a need-by time based on an estimated duration of the execution of the task. In some embodiments, using the systems and methods described herein, a timeout duration for a task may be determined such that it varies with one or more characteristics of the input data for the task. In some embodiments, using the systems and methods described herein, parameter values for the execution of a task (e.g., configuration parameters for the resources) may be automatically selected to optimize a cost and/or a completion time for the execution of the task.

In some embodiments, a resource management system may manage dynamic pricing, reservation, and allocation of network-accessible resources. Networks set up by an entity such as a company or a public sector organization to provide one or more services (such as various types of cloud-based computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In some embodiments, operators of provider networks may implement a flexible set of resource reservation, control, and access interfaces for their clients. For example, a resource manager of the provider network may implement a programmatic resource reservation interface (e.g., via a web site or a set of web pages) that allows clients to learn about, select, purchase access to, and/or reserve resource instances. Such an interface may include capabilities to allow browsing of a resource catalog and provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Some clients may wish to take full advantage of the choices available among various pricing options, resource sizes, and the like, and the clients may be willing to specify the details for each of the resource instances that they need. However, for certain types of applications, some clients may not be as concerned about exactly which type of resources are utilized and when, as long as the applications are completed on or before a specified deadline and within a specified budget. For example, scientists or researchers that wish to perform a potentially months-long series of computations using a bioinformatics, physics, or astronomy application may have a fairly limited budget, and may therefore be willing to trade off tight control on resource selection and scheduling in return for lower total costs of the computing. In some cases, clients may simply desire that a given task be completed at the lowest possible cost, regardless of exactly which resources are used or when. Other clients may wish to specify a few constraints—such as the total number and/or sizes of instances to be used, or in the case of data transfer tasks, the total amount of data to be transferred from a specified source to a specified destination—and may wish to leave the selection of the resources to the resource manager. For some clients, allowing a resource manager to select resources and schedule subtasks of the application may be considered a benefit in and of itself, independent of any monetary benefits. Given such flexibility, a resource manager may be able to make more effective scheduling decisions to meet the needs of a wider set of client: e.g., portions of the long-term computation tasks may be scheduled on resources during periods when the resources are not heavily utilized, and may be paused or suspended when the workload from other customers (who may be willing to pay a higher pricing rate than the scientists or researchers) on those resources increases. In embodiments where the provider network resources are organized into pools with associated pricing policies, the resource instances to be used during any given period of time for the long-term computations may be selected from the appropriate pool, e.g., a spot-instance pool or an on-demand instance pool, based for example on a current pricing of resources of the pool and a current utilization level of the pool.

According to one such embodiment, a resource manager in such an environment may receive a task execution query comprising a specification of a task to be performed for a client, where the specification has an associated target deadline for completion of the task and an associated budget constraint for completion of the task. In response, the resource manager may generate an execution plan for the task, where the execution plan comprises using one or more resources of a selected resource pool to perform at least a portion of the task. The resource pool may be selected based at least in part on the pricing policy of the resource pool and an analysis of the task specification. Other factors may also be taken into consideration in selecting the resource pool or resource type, such as whether the task or its subtasks can be resumed after an interruption without excessive overhead, and so on. The resource manager may provide an indication of the execution plan to the client in some embodiments, e.g., in order to receive an approval of the plan. The resource manager may then schedule an execution of at least a portion of the task on a resource from the selected resource pool.

In one simple scenario, the entire task may be scheduled as one unit of work, and after the task completes, the client may be notified of the task completion. In many scenarios, however, the task may be split into smaller subtasks, either based on explicit subtask boundaries defined by the client or based on automated subtask generation by the resource manager. In one embodiment, the client may be provided the opportunity to either specify the details of each subtask or opt in to an automated subtask scheduling option. Clients may specify various task and subtask properties in different embodiments, such as for example the interruptibility characteristics of the task or of individual subtasks, whether any or all of the subtasks can be run in parallel, performance requirements or desired resource sizes for the task or subtasks, and so on. In some embodiments, deadlines and or budget constraints may be specified at the subtask level as well as or instead of at the task level.

In some embodiments, the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). In some implementations, clients may also be able to specify preferred availability zones for their tasks and/or subtasks.

The resource manager may use the specified preferences and properties, the target deadline(s), and budget constraints in its attempt to identify the most suitable resources and/or resource pools for the client's tasks and/or subtasks. In some embodiments the resource manager may be configured to utilize resource usage history to help in resource selection and scheduling. For example, if the client has previously scheduled similar tasks, the resource manager may be able to use metrics gathered for the earlier tasks (such as whether and when tasks or subtasks were interrupted and restarted) to deduce interruptibility of the current tasks, which may in turn allow the resource manager to make better pool selection decisions. If the resource manager is able to determine that the subtasks of a client can be resumed without significant overhead, cheaper spot resource instances (which can be interrupted at short notice or without notice) may be an appropriate choice instead of potentially more expensive on-demand instances. In some embodiments, even if the client does not explicitly indicate that subtasks can be performed in parallel, the resource manager may be able to analyze the task specification provided by a client (or the client's resource usage history) and determine whether any subtasks can in fact be executed in parallel. Similarly, in some embodiments, the resource manager may be able to identify the performance ratings of the resources that may be needed for a task or subtask based on an analysis of the task specification and/or based on resource usage history.

In some embodiments, several different types of tasks and subtasks may be schedulable by the resource manager. For example, in one embodiment, the resource manager may be capable of scheduling data transfer tasks and subtasks, as well as compute tasks and subtasks. Whereas a compute task may require a successful execution of one or more applications, a data transfer task may (as its name implies) comprise the movement of a specified data set from a source device to a destination device. For example, a provider of online videos may wish to replicate or copy large video data sets from one set of storage devices at one data center of the provider network, to another data center, and the provider may wish to take advantage of the cost savings available by allowing the resource manager to schedule the transfer of the data over time, as long as an overall deadline is met. A source or destination device for a data transfer task or subtask may be within the provider network or may form part of a client network (i.e., the source or destination may be located at premises or data centers controlled managed or owned by the client). In some embodiments, a client task may comprise both compute subtasks and data transfer subtasks.

A variety of different techniques may be used for data transfer tasks or subtasks in different embodiments. For example, for data transfers between client network devices and provider network resources, the resource manager may have the option of using (a) a network path that is shared or sharable by multiple clients, (b) a network path that is dedicated for use by one client and includes a direct physical link installed at client request between the client's network equipment and the provider network's equipment, which may be referred to as private network paths or "direct-connect" paths, or (c) a transfer of portable physical storage device such as a removable disk drive, DVD, or the like.

In one embodiment, the resource manager may support several different types of task execution queries. As noted above, some task execution queries may specify both a time constraint (such as a deadline) and a budget constraint, and the resource manager may in response generate an execution plan intended to meet both those constraints. In a second type of task execution query, a client may specify a budget constraint and provide a task specification, and in effect ask the resource manager "How soon can you complete the specified task within this budget limit?" In a third type of task execution query, a client may specify a time constraint and in effect ask the resource manager "What is the lowest cost that you can quote for completing this task within these time constraints?" In some embodiments, another supported query type may simply request that the resource manager generate the execution plan with the lowest estimated execution cost, e.g., without a specified budget limit or even a specified deadline. Yet another query type may specify a required or minimum number of resource instances to be acquired for the task, independently of which locations the instances are in. Other query types may be supported as well, such as a request to transfer a specified data set, with no specific deadline or target budget. For each type of query, the resource manager may analyze the task specification describing the work required, as well as any other properties or characteristics specified by the client, and make a best-effort attempt to obtain an answer to the client's query.

The client may in some embodiments use an interface (such as one or more web pages, an application programming interface or API, or a command-line interface) implemented by an interface manager (which may be incorporated within the resource manager in some implementations) to specify task execution queries. By changing the parameters and constraints, the client may be able to try out a variety of different "what-if" scenarios before agreeing to a particular execution plan. In some embodiments, clients may be able to view the current execution status of their tasks or subtasks using the interface. In some embodiments, additional information about executed tasks and subtasks may be available via the interface or interfaces, such as program output, error logs, exception logs, and so on.

Example System Environment

FIG. 1 illustrates an example system environment for a resource management system, according to at least some embodiments. The resource management system 100 includes a provider network 110 comprising a plurality of geographical regions such as regions 112A and 112B. Each geographical region 112 may include one or more availability zones 120, such as availability zones 120A and 120B in region 112A, and availability zones 120K and 120L in region 112B. Each availability zone 120 may in turn include a plurality of resources such as resource instances 130A, 130B, 130D, 130E, 130G and 130H in availability zone 120A. The instances may be organized into various resource pools in some embodiments, such as reserved instance pool 121A, on-demand instance pool 121B, and spot instance pool 121C. The various resource instances 130 in the different availability zones 120 may be reserved and/or allocated for use by a client 148. Each instance pool 121 may have associated resource management and pricing policies, governing for example whether a reservation or allocation of a resource instance can be interrupted, whether reservations of one client can be resold to another, the different types of static and dynamic pricing rates in effect for instances of the pool, and so on. For clarity, the various types of instance pools 121 that may be implemented are shown only for availability zone 120A in FIG. 1; the other availability zones may have their own sets of instance pools 121. Not all the availability zones may implement the same sets of pools: for example, some availability zones may implement only reserved instance pools and on-demand pools, and may not implement a spot instance pool. In some embodiments, other instance pools not shown in FIG. 1 may be implemented, such as an "available instance" pool comprising currently idle instances, from which instances may be moved to other pools in response to instance enablement requests. It is noted that the pools may represent logical collections or aggregations, so that, for example, the presence of two instances in the same pool or sub-pool may not necessarily imply anything about the physical location of the hardware used for the two instances.

In the illustrated embodiment, resource management system 100 includes a resource manager 180 operable to perform a variety of operations in response to requests submitted by a client 148. An interface manager component 183 of the resource manager 180 may, in some embodiments, implement one or more programmatic interfaces allowing a client 148 to submit task execution queries in which task specifications, goals, requirements, deadlines, and/or budget constraints are specified, and respond to such requests by generating task execution plans, as described below in further detail. In some embodiments, instead of being included within the resource manager 180, the interface manager 183 may be implemented externally. If an acceptable task execution plan is found, the resource manager 180 may schedule the tasks in accordance with the plans, using resources 130 selected from one or more pools 121 at one or more availability zones 120. In some embodiments the resource manager 180 may wait for a task implementation request from the client before initiating the task. The interface implemented by the resource manager 180 may also support a variety of other functionality: e.g., allowing clients to search for, browse, reserve and acquire desired types of instances 130 to obtain various types of services, e.g., to run and/or access various applications. Although the instances 130 illustrated in FIG. 1 are shown as belonging to availability zones 120, in other embodiments the provider network 110 may be organized differently: e.g., in some embodiments, availability zones may not be implemented. Instance pools may be implemented within availability zones in some implementations (e.g., each availability zone may have its own reserved instance pool), while in other implementations an instance pool or sub-pool may span multiple availability zones.

As indicated in FIG. 1, the resource manager 180 may receive task execution queries of various types from clients 148. In one type of query, the client may specify task specifications such as the executable program or programs to be used, a time constraint for completion of the task, and a budget constraint indicating, for example, a maximum amount the client is willing to pay for completion of the task. Queries which simply request that the resource manager respond with the lowest-estimated-cost execution plan may be supported in some embodiments, e.g., without a specified deadline or a specified budget limit being indicated by the client. In another embodiment, clients may specify a required or minimum number of resource instances (the types/sizes of instances needed may also be specified in some cases) for the task, without indicating specific availability zones or other location details of the instances. For data transfer tasks, in some embodiments, the data set to be transferred may be specified, as well as source/destination information, e.g., without specific budget limits or deadlines. In response, the resource manager 180 may generate one or more execution plans for the task, using the information provided by the client in the request, as well as additional sources of information such as the pricing and/or interruptibility polices in effect for the various resource pools 121, and in some cases resource usage data. The resource usage data (which may be retrieved from resource management database 191 in some embodiments) may, for example, include the requesting client's past task execution history, resource utilization history, billing history, and overall resource usage trends for a given set of instances 130 that may be usable for the client's tasks. In some cases, the resource manager may use past resource usage data and trends for a given set of resource instances to develop projections of future resource usage and use these projections in developing the execution plan or plans. Based on an analysis of the task specification and information from some or all of these additional data sources, the resource manager 180 may select one or more resource pools 121 to perform at least a portion of the task as part of an execution plan. In some embodiments, the resource manager 180 may send a notification of an execution plan to the client 148. In response to a task implementation request from the client 148, the resource manager 180 may schedule and/or initiate at least a portion of the task at a resource instance from a pool identified for the execution plan. In some embodiments, a task implementation request separate from the task execution query may not be required: i.e., if the resource manager 180 can find an execution plan that meets the various constraints indicated in the execution query, the execution plan may be initiated without further interaction with the client 148.

In some embodiments the interface implemented by the interface manager 183 or the resource manager 180 may allow the client 148 to specify various preferences or suggestions that may be useful in generating the execution plans. For example, in one embodiment, the client 148 may specify details of subtasks into which the task can be divided, e.g., for finer grained scheduling. If the client is willing to let the resource manager 180 partition the task into subtasks, then a preference or setting for automated subtask generation may be specified instead. For example, in some cases, the client's applications may conform to a well-known execution pattern or industry standard methodology (such as the map-reduce programming framework or one of various parallel programming approaches that use the message passing interface or MPI), and the resource manager 180 may be able to determine subtask boundaries as a result of analyzing the task specification or description provided by the client. Interruptibility settings or preferences for the task or subtasks may be included in the execution query in some embodiments. If the nature of the task application or applications is such that a given task or subtask may be paused and then later resumed without substantial overhead or redo work required, then the task may be suitable for spot instances, for example; and conversely, if it is difficult to save task or subtask state for resumption, or if the entire task has to be repeated if it is interrupted, the task may be more suitable for on-demand instances or reserved instances. In some embodiments, the resource manager 180 may be able to deduce interruptibility characteristics, e.g., based on analyzing the task specification, analysis of previously submitted tasks, or other factors, instead of relying on the client to provide interruptibility preferences. In some cases, the choice of the specific pool to be used for a client's task may be made based largely on the deadline and price rather than on interruptibility: e.g., even if a client's task can be resumed after interruption with relatively small overhead, it may be advisable to use a non-interruptible instance such as an on-demand instance instead of a spot instance, simply because the task deadline is close and even the small interruptibility overhead may potentially cause the deadline to be missed.

Clients 148 may also specify parallelizability characteristics of their applications in some embodiments, e.g., indicating whether some or all sub-tasks can be run in parallel if sufficient resources are available. In one embodiment, as in the case of interruptibility characteristics discussed above, the resource manager may be able to analyze the task specification to identify whether any sub-tasks are parallelizable. The preferred performance ratings of resources to be used for various tasks or subtasks may also be specified via the interface in some embodiments, e.g., the client may indicate that resources with performance equivalent to four 3 GHz cores of a particular CPU architecture should be dedicated for a given subtask if possible. If the client 148 does not specify the resource performance requirements, the resource manager 180 may choose the size of the instances to be used, again based on analysis of the task specification and/or resource usage history for similar tasks executed in the past. Location-related preferences (such as availability zones or regions in which the task should be scheduled) may also be provided by the client in some embodiments. The prior resource usage history of the client, as well as data about the locations where the client currently has resources in use or reserved, may also be used to decide instance locations for the client's task execution.

In some embodiments, both compute tasks (which require a successful execution of a program executable) and data transfer tasks (which require a specified data set to be successfully transported from a source device to a target device) may be supported. A given task may include compute subtasks as well as data transfer subtasks in such embodiments. In some implementations, data transfer operations may be combined with computation operations in a given subtask or task.

The resource manager 180 may support several types of task execution queries in some embodiments. For example, a client 148 may, instead of supplying a deadline for a task, wish to determine the earliest possible time at which a task can be completed within a given budget constraint. Or, the client 148 may, instead of specifying a budget constraint, wish to determine the cost of completing a task before a target deadline. As noted above, various other types of task execution queries may also be supported in some embodiments: e.g., queries requesting a least-estimated-cost plan, queries requesting plans that include acquiring a specified number and/or type of resource instance, or queries that request plans for data transfers of a specified amount of data or a specific data set. The interface for task execution requests supported by the resource manager 180 may allow clients to specify various different "what-if scenarios" using combinations of such different types of queries before a specific execution plan is chosen or approved for implementation. Once an execution plan is implemented, e.g., by starting an execution of a first compute sub-task or data transfer sub-task, the client 148 may be allowed to view the current status of the execution via the interface in some embodiments.

As subtasks are executed, or even during the execution of a given subtask or task, the resource manager 180 may in some embodiments regenerate or refresh the execution plan, e.g., based on current operational conditions and prices in the provider network. For example, especially for long-running tasks or subtasks, utilization levels or prices may have changed since the initial execution plan was formulated, which may lead the resource manager 180 to modify the plans for the remaining portion of the task. In addition, a given subtask may take longer or use more resources than was estimated when the initial execution plan was generated, which may also influence the scheduling of the remaining subtasks. In some embodiments the resource manager 180 may notify (or obtain approval from) the client 148 when execution plans are to be changed; in other embodiments, as long as the original constraints for pricing and/or timing specified by the client are met, the resource manager 180 may not be obligated to inform the client of changes to the plan.

Resource Instances Categories and Associated Pricing Models

Figure 2B:
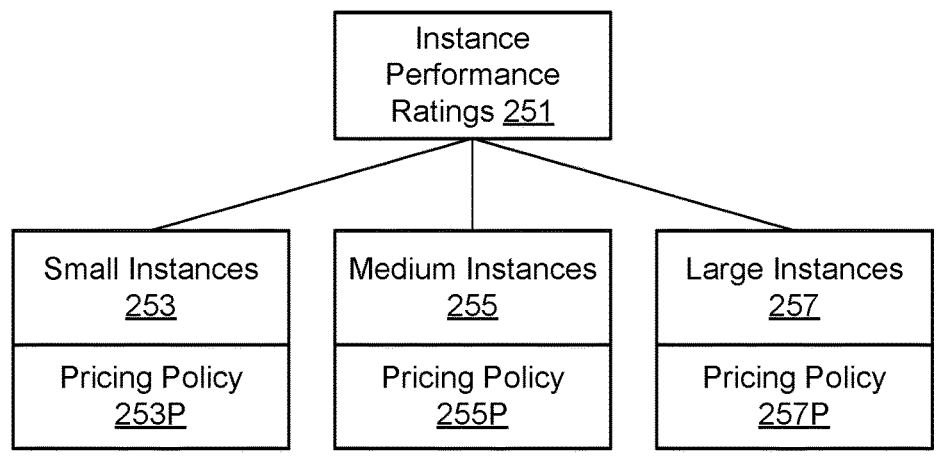

As noted above, the resource instances 130 of a provider network may be grouped into classes or categories based on several different dimensions in some embodiments, and the pricing policies associated with different classes may differ. Some of the categories may be reflected in the manner in which the resources are organized into pools, as indicated in FIG. 1. FIGS. 2a and 2b illustrate example resource instance classification approaches, according to at least some embodiments. FIG. 2a illustrates an approach in which instances are classified based in part on the timing or duration of instance allocations, i.e., on when instances are obtained by clients and when they are released by the clients. Three high-level types 201 of resource instances are shown: reserved instances 203, on-demand instances 205, and spot-instances 207, each with respective pricing policies 203P, 205P and 207P. In one embodiment, a client 148 may reserve an instance for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed.

If a client 148 does not wish to make a long-term reservation, the client may instead opt to use on-demand instances 205 (or spot instances 207). The pricing policy 205P for on-demand instances 205 may allow the client 148 to pay for resource capacity by the hour with no long-term commitment or upfront payments. The client 148 may decrease or increase the resource capacity used, based on application needs, and may only have to pay the hourly rate for the instances used. In some cases, the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances. Spot instances 207 may provide a third type of resource purchasing and allocation model. The spot pricing policy 207P may allow a client 148 to specify the maximum hourly price that the client is willing to pay, and the resource manager 180 may set a spot price for a given set of resource instances 130 dynamically based on the prices clients are willing to pay and on the number of instances available to support the spot model. If a bid from a client 148 meets or exceeds the current spot price, an instance may be allocated to the client. If the spot price rises beyond the bid of the client using a spot instance 207, access to the instance by the client may be revoked (e.g., the instance may be shut down).

The prices of reserved instances 203, on-demand instances 205, and spot instances 207 may also vary based on the availability zones 120 or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance 130 may be defined as the ratio of the amount of time the instance is activated to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs.

Instance pricing may also vary based on other factors. For example, in the case of compute instances, the performance capacities of different CPUs and other components of compute servers such as memory size may come into play. FIG. 2b shows an example classification of compute instances based on instance performance ratings 251. Large instances 253 may have more computing capacity than medium instances 255, which in turn may have more computing capacity than small instances 257. Accordingly, different pricing policies 253P, 255P and 257P may be implemented for the different sizes of instances. In one embodiment, a task execution query submitted by a client may specify the sizes and/or types of instances to be acquired, and the task execution query may leave the decision of where the instances are obtained (e.g., which availability zone or zones) up to the resource manager 180. For example, a task execution request may in effect ask the resource manager "Please generate an execution plan to allocate six large instances for my task; other details of when and where the task gets executed are up to you." In some embodiments, software features such as operating systems, hypervisors, middleware stacks, and the like may also be taken into account in determining the pricing policies associated with various instances. For both compute instances and storage instances, storage device characteristics such as total storage capacity, supported I/O rates, and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. The various pricing policies, including static and dynamic components of pricing, as well as location-dependent and location-independent components, may be taken into consideration by the resource manager 180 when developing execution plans in response to task execution queries in some embodiments, as described below in further detail. Some or all of the pricing information may be stored in and retrieved from resource management database 191.

Information Sources Used for Execution Plan Generation

Figure 3:
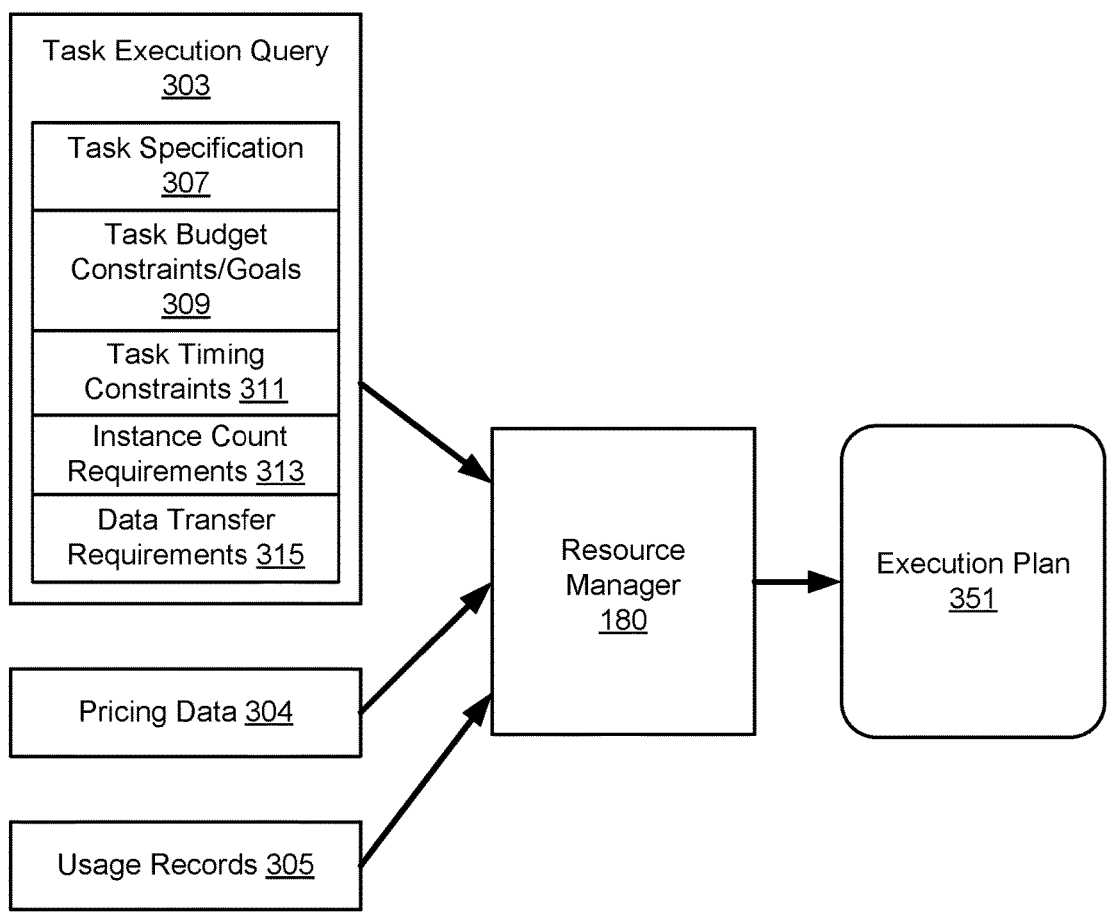
FIG. 3 illustrates an example of a set of data sources used by a resource management system, according to one embodiment.

FIG. 3 illustrates an example of a set of sources from which data may be gathered by resource manager 180 to generate task execution plans, according to one embodiment. As shown, the resource manager 180 may obtain task specifications 307, task budget goals (which may be expressed simply by indicating that the plan for the lowest feasible estimated cost should be generated) or constraints 309 (such as specified budget targets), and/or task timing constraints such as deadlines 311, from the task execution query 303 submitted by a client 148. In some embodiments, clients may specify instance count requirements 313 (e.g., a requirement that N instances of a particular type be allocated) and/or data transfer requirements 315 (e.g., indicating an amount of data to be transferred, or a specific data set to be transferred, from a specified source to a specified destination). The task specification 307 may indicate various details of the task, e.g., whether the task is a compute task or a data transfer task, what programs or executables are to be used for the task, how the success of the task is to be determined, performance-related requirements (such as minimum CPU power, memory size, network bandwidth), and so on. In embodiments where the client 148 is allowed to specify subtasks, the same kinds of information may be specified for each subtask. Budget constraints and timing constraints may also be specified at the subtask level as well as, or instead of, at the task level in some embodiments. Budget constraints 309 may include, for example, the total price the client is willing to pay for task or subtask completion or the maximum usage-based billing rate the client is willing to pay. Timing constraints 311 may indicate the deadline by which the task or subtask is to be completed. In some embodiments, specific budget constraints and/or timing constraints may be omitted, allowing the resource manager 180 even greater flexibility in planning and scheduling tasks and subtasks.

The pricing data 304 used by the resource manager 180 may include the current pricing in effect for the various types of resources (such as on-demand or spot instances) at various locations of the provider network as well as past variations in such prices over time. In some embodiments, the resource manager 180 may develop a predictive model that projects pricing changes in the future, e.g., based on pricing variations in the past. Especially for long-lasting tasks and subtasks, the projections of future pricing based on past trends may be useful in determining the execution plans for the client's query. Resource usage records 305 for the requesting client 148, as well as overall resource utilization data for the various types of instances supported, may also be helpful in deciding where the client's tasks should be run and when. The resource manager 180 may be able to identify similarities between a client's previously-executed tasks and the current task specification 307 in some embodiments, allowing the resource manager 180 to make more informed choices. For example, in one scenario, a task T1 may have been executed earlier on behalf of a given client using a resource instance R1 at an availability zone AZ1, and the initial estimates for the time it took to complete T1 were eventually found to be incorrect by 10%. If a new task execution query 303 for a task T2 is received from the same client, such that the task specification 307 for T2 is very similar to the task specification received earlier for T1, the resource manager 180 may be in a position to make a better estimate for how long it might take to complete T2, using records for the resources used by T1. In addition, the resource manager 180 may also decide to use similar resources at the same availability zone AZ1 that was used before, for example because the usage history data indicates that the similar task T1 completed successfully without any functional errors. More general resource usage data (i.e., data not specific to the requesting client) may also be useful in deciding the specific location and type of resources to be used for the current request. For example, the resource manager may schedule the new tasks at a more lightly-utilized availability zone than one that is extremely busy. Projections for future resource utilizations may also be made based on past usage data, and may in some implementations be tied to projections of future pricing. Pricing data 304 and/or usage records 305 may be maintained in a repository such as resource management database 191 in some embodiments. In some implementations, the resource manager 180 may obtain current resource usage data from various monitoring agents distributed in the provider network, instead of or in addition to obtaining historical usage data from a repository.

Taking some or all of these data into account, together with the contents of the query 303, the resource manager 180 may generate at least one task execution plan 351 that meets the client's constraints. The task execution plan may include such details as when and where various subtasks are to be initiated, the current estimate of when they are expected to be completed, the estimated costs, and so on. In some embodiments, task execution plans 303 may be stored in a persistent store such as the resource management database 191 as well, e.g., as an XML file or in some other appropriate format. In some embodiments, a client 148 may be billed a specified amount for the generation of a task execution plan, e.g., based on the complexity of the task specification 307, while in other embodiments an execution plan may be generated without an associated billing amount. In one embodiment, if the resource manager is unable to generate even one execution plan 351 that meets the constraints specified by the client, the resource manager 180 may suggest alterations to the constraints that may lead to feasible execution plans. For example, the resource manager 180 may indicate to the client that while the specified task cannot be completed within the requested thirty days for the requested price, it may be feasible to complete the task within forty days for the requested price. After an execution plan 351 is accepted, it may be put into effect by the resource manager 180 in accordance with a schedule included in the plan.

Cost-Minimizing Task Scheduler

In some embodiments, using the systems and methods described herein, a task may be scheduled to finish prior to a need-by time that may be specified by a client. Based on prior execution times for similar tasks in addition to other usage data for the provider network, an estimated duration of the execution of the task may be determined so that the task may be automatically scheduled to complete by the user-specified deadline. Through the added flexibility of the execution window provided by the need-by time, the cost of the compute instances and other resources used to execute the task may be minimized.

Figure 4:
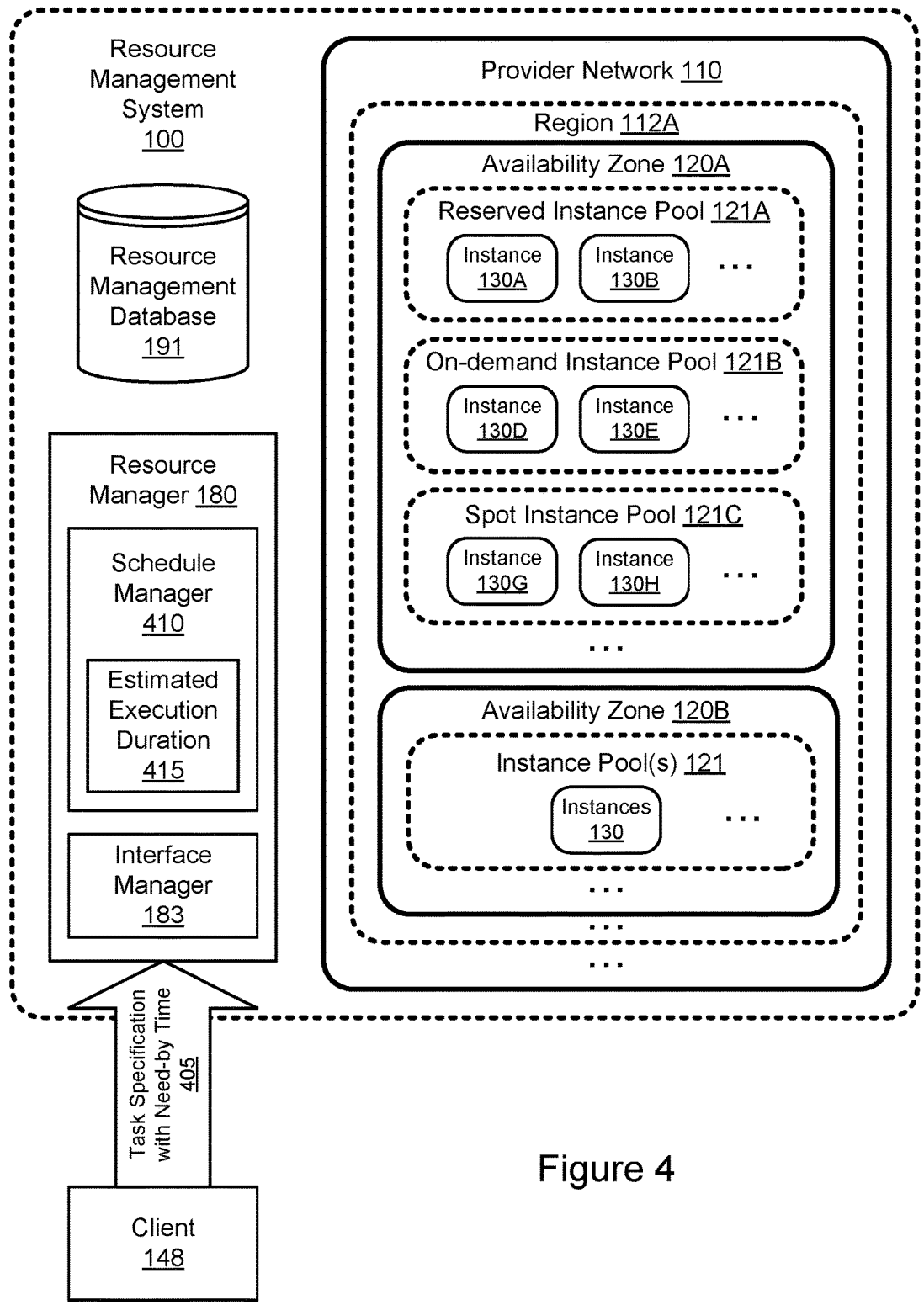
FIG. 4 illustrates an example system environment for a resource management system including need-by time scheduling, according to one embodiment.

FIG. 4 illustrates an example system environment for a resource management system including need-by time scheduling, according to one embodiment. As discussed above with respect to FIG. 1, the resource management system 100 includes a provider network 110 comprising a plurality of geographical regions such as region 112A. Additional geographical regions are not illustrated in FIG. 4. Each geographical region 112 may include one or more availability zones 120, such as availability zones 120A and 120B in region 112A. Each availability zone 120 may in turn include a plurality of resources such as resource instances 130A, 130B, 130D, 130E, 130G and 130H in availability zone 120A. The instances may be organized into various resource pools in some embodiments, such as reserved instance pool 121A, on-demand instance pool 121B, and spot instance pool 121C. The various resource instances 130 in the different availability zones 120 may be reserved and/or allocated for use by a client 148. Each instance pool 121 may have associated resource management and pricing policies, governing for example whether a reservation or allocation of a resource instance can be interrupted, whether reservations of one client can be resold to another, the different types of static and dynamic pricing rates in effect for instances of the pool, and so on.

In the illustrated embodiment, resource management system 100 includes a resource manager 180 operable to perform a variety of operations in response to requests submitted by a client 148. An interface manager component 183 of the resource manager 180 may, in some embodiments, implement one or more programmatic interfaces allowing a client 148 to submit a task specification with a need-by time 405. The need-by time may comprise a date and time by which the client 148 expects execution of the task to be completed. The task specification 405 may supply the definition of a task to be scheduled, including an identification of the function(s) to be performed or program(s) to be executed, an identification of the input data, constraints such as the need-by time, etc. In the illustrated embodiment, the resource manager 180 also includes a schedule manager component 410 that is operable to schedule the execution of tasks. As will be described in greater detail below, the schedule manager 510 may determine an estimated execution duration 415 for the task defined by the task specification 405. The schedule manager 410 may then schedule the task to begin executing at a particular time so that execution of the task is completed prior to the need-by time. In some embodiments, the scheduled time to begin execution of the task may be considerably later than the time at which the task specification is submitted by the client 148.

In one embodiment, the schedule manager 410 may determine the estimated execution duration 415 based on resource usage data such as, for example, task execution history, resource utilization history, and overall resource usage trends for a given set of instances 130 that may be usable for the submitted task. The resource usage data may be retrieved from resource management database 191. In some cases, the resource manager may use past resource usage data and trends for a given set of resource instances to develop projections of future resource usage and use these projections in determining the estimated execution duration 415. Based on an analysis of the task specification and information from some or all of these additional data sources, the resource manager 180 may select one or more resource pools 121 to perform at least a portion of the task.

Elements of the resource usage data that are relevant to an execution window for the submitted task may be used. In one embodiment, the execution window may begin with the submission of the task definition 405 by the client 148 and end at the need-by time. For example, if the execution window begins at 5 PM and ends at 11 PM on a Monday, then resource usage trends for various of the instance pools in the provider network 110 may be analyzed for the same times of the day on previous Mondays. The execution history for similar tasks may also be analyzed, where such history is available. In one embodiment, if the execution history for similar tasks is not available, then the user may be prompted to provide an estimated execution duration 415. In one embodiment, the estimated execution duration 415 may be determined by executing only a portion of the submitted task and then extrapolating the total estimated execution duration 415 from the partial execution duration.

By using the scheduling flexibility provided by the execution window, the cost of executing the task may be minimized. As discussed with respect to FIGS. 2a and 2b, each of the instance types may have a different pricing policy and associated cost. Accordingly, in some embodiments, the schedule manager 410 may schedule the task to execute using the lowest-cost instance pool that is available to complete execution of the task within the execution window for the task. Using the resource usage data, the schedule manager 410 may determine the estimated execution duration 415 of the submitted task for one or more instance pools in the provider network 110. In one embodiment, for example, the estimated execution duration 415 may be determined to be shorter for the on-demand instance pool 121B and longer for the spot instance pool 121C. Furthermore, the cost of using the instance pool with the shorter estimated execution duration (e.g., the on-demand instance pool 121B) to perform the submitted task may be more than the cost of using the instance pool with the longer estimated execution duration (e.g., the spot instance pool 121C). In one embodiment, therefore, the task may be scheduled to execute on the lower-cost (and slower) instance pool if the execution window is long enough to complete the task but on the higher-cost (and faster) instance pool otherwise.

Accordingly, the resource manager 180 may select the instance pool to begin execution of the task based on the cost-minimization analysis discussed above. In one embodiment, the resource manager 180 may monitor the execution of the task. If resource manager 180 determines that the task is not executing rapidly enough to complete execution on the selected instance pool by the need-by time, then the resource manager 180 may select a faster (but typically higher-cost) resource pool on which to complete the execution of the task. The resource manager 180 may then switch the execution of the task to the faster resource pool so that the task is completed by the need-by time.

In one embodiment, the task may correspond to one node in a graph that includes multiple nodes, each node representing a different task. The global cost of executing all the tasks in the graph may be minimized using the techniques described herein. The graph may comprise a dependency graph such that execution of at least one of the tasks is dependent on execution of at least one of the other tasks. The graph may represent a portion of the tasks that are submitted to or scheduled to execute on the provider network 110 over a particular window of time. Any suitable subset of tasks may be added to a particular graph for minimization of the cost of executing the entire graph.

In one embodiment, the estimated execution duration 415 may include a single duration for each compute resource that is analyzed. In one embodiment, the estimated execution duration 415 may include a probability distribution or other range of values for one or more types of compute resources and/or configurations thereof. The estimated execution duration 415 may also include different values for execution at different times of day. Each possibility within the estimated execution duration 415 may be associated with an anticipated usage cost for particular resource(s) over the time during which the resource(s) will be used by the task.

In one embodiment, the schedule manager 410 may generate one or more contingency plans. For example, if execution according to a first plan fails (e.g., if the selected computing resources experience failure), the schedule manager 410 may select another option from the contingency plan(s) and move execution of the task to another set of computing resources. The plan(s) may be based on a range of potential values associated with the estimated execution duration 415, e.g., based on differences among different types of computing resources and configurations.

In one embodiment, the client 148 may be given a discounted price for submitting the task definition with the need-by time 405. The discount may include a percentage off and/or any other reduction from a regular price for execution of the task. In one embodiment, the discount may include actual pass-through savings. A longer execution window may provide the potential for greater cost minimization than a shorter execution window. Therefore, the discount may vary with the size of the execution window, such that the client may be given a greater discount for a later need-by time than for an earlier need-by time.

Figure 5:
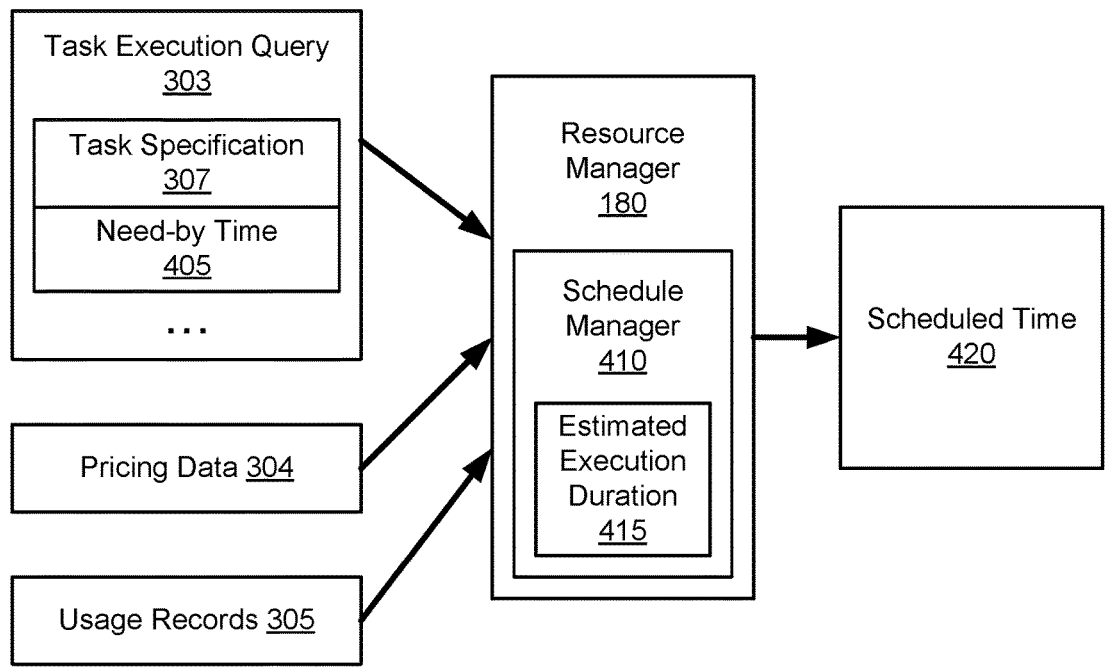
FIG. 5 illustrates an example of a set of data sources including a need-by time used by a resource management system to schedule a task, according to one embodiment.

FIG. 5 illustrates an example of a set of data sources including a need-by time used by a resource management system to schedule a task, according to one embodiment. As part of the task execution query 303 submitted by a client to define a task, a task specification 307 and need-by time 405 may be provided to the resource manager 180. The task execution query may include additional elements of the task definition, as illustrated in FIG. 3. The task specification 307 may indicate various details of the task, e.g., whether the task is a compute task or a data transfer task, what programs or executables are to be used for the task, how the success of the task is to be determined, performance-related requirements (such as minimum CPU power, memory size, network bandwidth), and so on.

The pricing data 304 used by the resource manager 180 may include the current pricing in effect for the various types of resources (such as on-demand or spot instances) at various locations of the provider network as well as past variations in such prices over time. In some embodiments, the resource manager 180 may develop a predictive model that projects pricing changes in the future, e.g., based on pricing variations in the past. Especially for long-lasting tasks and subtasks, the projections of future pricing based on past trends may be useful in determining the execution plans for the client's query. Resource usage records 305 for the requesting client 148 or for other clients, as well as overall resource utilization data for the various types of instances supported, may also be helpful in selecting the instance types and scheduled time for the submitted task.

Based on the usage records 305, the resource manager 180 may be able to identify similarities between a client's previously executed tasks and the current task specification 307 in some embodiments, allowing the resource manager 180 to make more informed choices. For example, in one scenario, a task T1 may have been executed earlier on behalf of a given client using a resource instance R1 at an availability zone AZ1, and the initial estimates for the time it took to complete T1 were eventually found to be incorrect by 10%. If a new task execution query 303 for a task T2 is received from the same client, such that the task specification 307 for T2 is very similar to the task specification received earlier for T1, the resource manager 180 may be in a position to make a better estimate for how long it might take to complete T2, using records for the resources used by T1. In addition, the resource manager 180 may also decide to use similar resources at the same availability zone AZ1 that was used before, for example because the usage history data indicates that the similar task T1 completed successfully without any functional errors. More general resource usage data (i.e., data not specific to the requesting client) may also be useful in deciding the specific location and type of resources to be used for the current request. For example, the resource manager may schedule the new tasks at a more lightly-utilized availability zone than one that is extremely busy. Projections for future resource utilizations may also be made based on past usage data, and may in some implementations be tied to projections of future pricing. Pricing data 304 and/or usage records 305 may be maintained in a repository such as resource management database 191 in some embodiments. In some implementations, the resource manager 180 may obtain current resource usage data from various monitoring agents distributed in the provider network, instead of or in addition to obtaining historical usage data from a repository.

Based on some or all of these sources of information and constraints, the schedule manager 410 may determine an estimated execution duration 415 for the task for one or more instance types or instance pools. The resource manager 180 may also select one or more compute instances (e.g., an instance pool) for execution of the task in order to minimize the cost of executing the task. The schedule manager 410 may determine a scheduled time 420 to begin execution of the task on the selected compute instances (e.g., the selected instance pool). As discussed above with respect to FIG. 4, the scheduled time 420 and selected instance pool may be selected in order to minimize a cost of executing the task within the execution window determined by the need-by time. The resource manager 180 may then oversee the execution of the task on the selected instance pool at the scheduled time 420.

Figure 6:
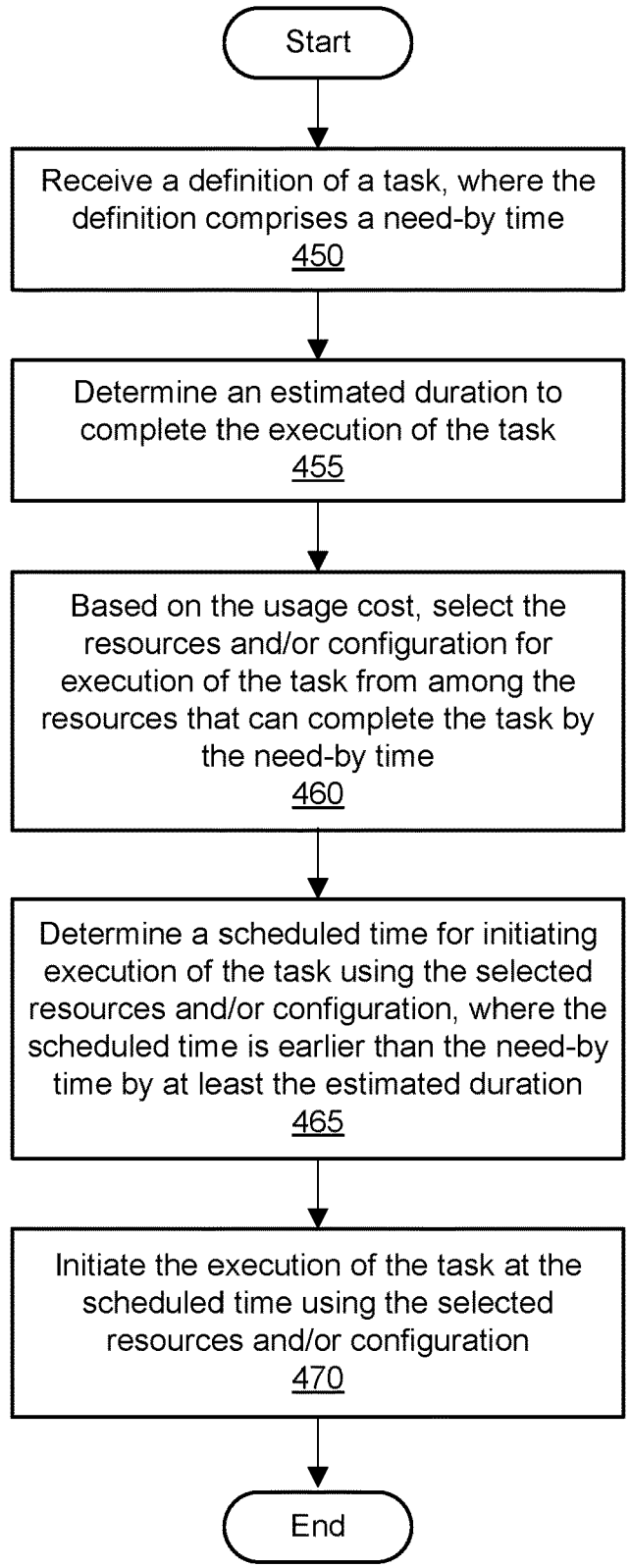
FIG. 6 is a flowchart illustrating a method for scheduling execution of a task using a need-by time, according to one embodiment.

FIG. 6 is a flowchart illustrating a method for scheduling execution of a task using a need-by time, according to one embodiment. As shown in 450, a definition of a task may be received. In one embodiment, the definition may be part of a task execution query. The definition may comprise a need-by time as a time constraint for execution of the task. The need-by time may comprise a point in time (e.g., a specific date and specific time of day) by which execution of the task needs to be completed. The need-by time may be a user-specified deadline for completion of execution of the task.

As shown in 455, an estimated duration to complete the execution of the task may be determined. The estimated duration may be determined for a plurality of different types of compute resources (e.g., a plurality of instance pools) and/or different configurations of the compute resources. Different types and/or configurations of the compute resources may have different usage costs such that execution of the task on one instance type/configuration may be costlier than execution on another instance type/configuration. In various embodiments, the estimated duration may be based on one or more prior executions of the task, on a prior execution of one or more other tasks, on a user-supplied estimate, etc. In one embodiment, the estimated execution duration at various different times of day may be determined for each resource and/or configuration.

As shown in 460, one or more compute resources and/or configurations may be selected for execution of the task based on the anticipated usage cost. In one embodiment, the lowest-cost compute instance pool may be selected from the compute instance pools that are available to complete the execution of the task within the execution window, i.e., from the compute instance pools having an estimated duration allowing completion of the execution of the task prior to the need-by time. Because the anticipated cost may be dependent on the time of execution, the resource(s) and/or configuration(s) at different times of day may be compared in selecting the resource(s) and/or configuration(s) to minimize the cost of execution. In one embodiment, the task may correspond to a node in a graph that represents multiple tasks, and the global cost of executing all the tasks in the graph may be minimized.

As shown in 465, a scheduled time for initiating execution of the task may be determined. The scheduled time is earlier than the need-by time by at least the estimated duration. As shown in 470, the execution of the task may be initiated at a scheduled time using the selected compute resources and/or configuration. If, after execution of the task begins, it is estimated that the need-by time is unlikely to be met, then the execution may be transferred to another set of computing resources.

In one embodiment, a price may be assessed to a customer for the execution of the task. The customer price may include a discount based on the use of the need-by time to schedule the execution of the task. In one embodiment, an execution window for the task begins at a first point in time (e.g., a time at which the definition of the task is received) and ends at a second point in time (e.g., a time based on the need-by time), and the discount varies based on the size of the execution window.

Timeouts as a Function of Input Data Characteristics

In some embodiments, using the systems and methods described herein, a timeout duration for a task may be determined such that it varies with one or more characteristics of the input data for the task. In one embodiment, a timeout duration for a task indicates a duration at which the execution of the task should be stopped before completion. In other words, if the execution of the task exceeds the timeout duration, the task is considered to have failed. In various embodiments, characteristics of the input data that may be used to determine the timeout duration include, but are not limited to: the size of the input data, the size of a portion of the input data (e.g., one data type of multiple data types), the number of elements of input data, the number of iterations or processes (e.g., simulations) needed to process the input data completely, a parameter of the task, a client-supplied function or value that indicates the complexity or cost of the task, etc. For example, some tasks may have input data sets whose size or complexity experiences a regular variation, and the time taken to complete such tasks may similarly vary. Instead of basing the timeout duration on a user-specified time value or a fixed time value for a type of task (e.g., two hours), the timeout duration may be automatically determined as a function of one or more characteristics of the input data used by the task, potentially including characteristics specified for execution of the task itself. In one embodiment, the client may instruct the resource manager 180 (e.g., as part of the task execution query 303) to set the timeout duration as a function of the input characteristic(s) and not as an absolute time value. In one embodiment, the timeout duration may be determined in a manner that is invisible to the client and not based on direct input from the client.

Figure 7:
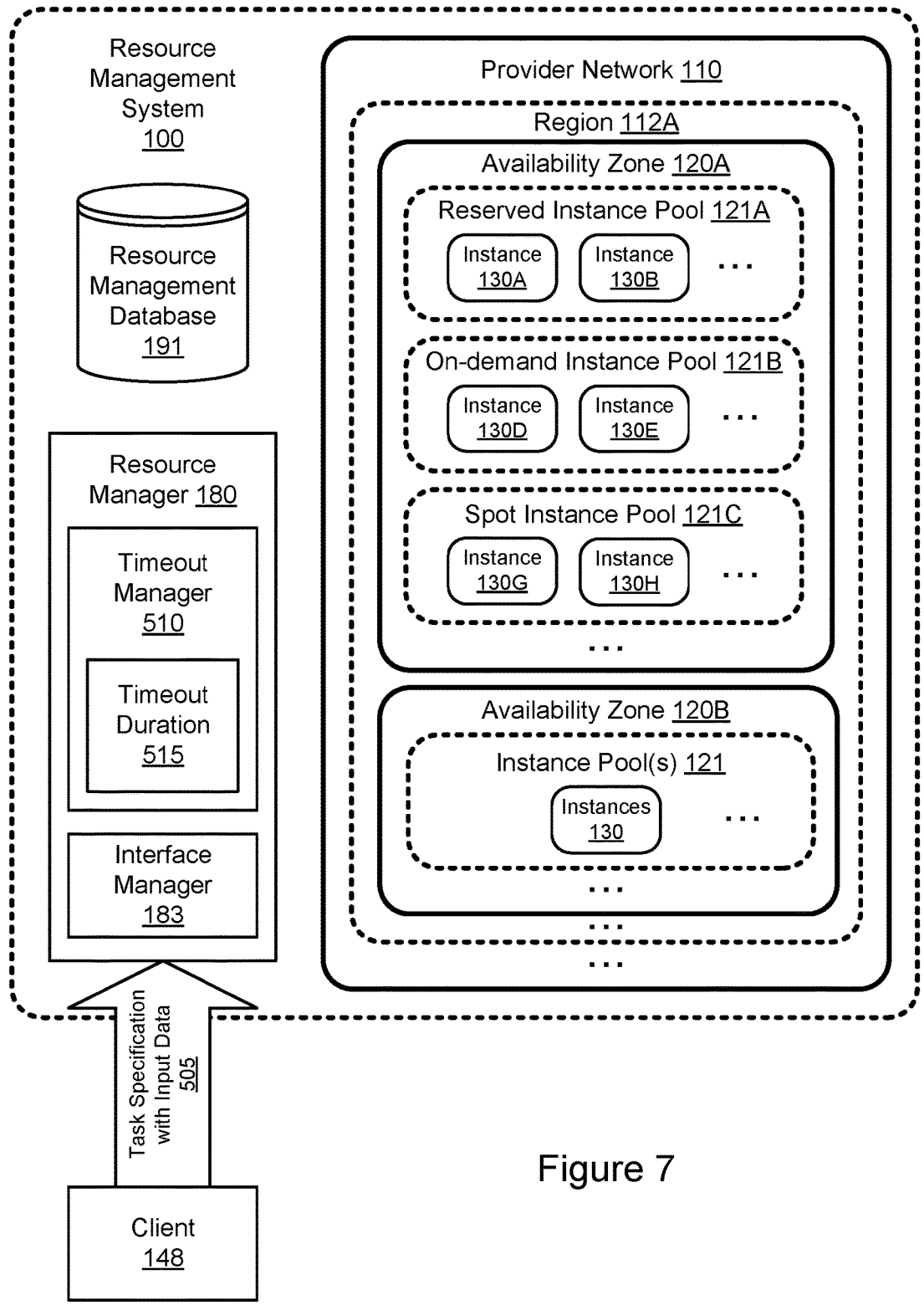
FIG. 7 illustrates an example system environment for a resource management system including timeouts based on input data characteristics, according to one embodiment.

FIG. 7 illustrates an example system environment for a resource management system including timeouts based on input data characteristics, according to one embodiment. As discussed above with respect to FIG. 1, the resource management system 100 includes a provider network 110 comprising a plurality of geographical regions such as region 112A. Additional geographical regions are not illustrated in FIG. 7. Each geographical region 112 may include one or more availability zones 120, such as availability zones 120A and 120B in region 112A. Each availability zone 120 may in turn include a plurality of resources such as resource instances 130A, 130B, 130D, 130E, 130G and 130H in availability zone 120A. The instances may be organized into various resource pools in some embodiments, such as reserved instance pool 121A, on-demand instance pool 121B, and spot instance pool 121C. The various resource instances 130 in the different availability zones 120 may be reserved and/or allocated for use by a client 148. Each instance pool 121 may have associated resource management and pricing policies, governing for example whether a reservation or allocation of a resource instance can be interrupted, whether reservations of one client can be resold to another, the different types of static and dynamic pricing rates in effect for instances of the pool, and so on.

In the illustrated embodiment, resource management system 100 includes a resource manager 180 operable to perform a variety of operations in response to requests submitted by a client 148. An interface manager component 183 of the resource manager 180 may, in some embodiments, implement one or more programmatic interfaces allowing a client 148 to submit a task specification with a set of input data 505. The set of input data may have characteristics such as a particular size of the input data. The set of input data may also include parameters relating to the execution of the task, e.g., the number of simulations to run. The size of the input data set may be measured in any suitable manner, such as in absolute terms (e.g., 10 MB), in the number of data elements or records to be processed, etc. The task specification with input data 505 may supply the definition of a task to be scheduled, including an identification of the function(s) to be performed or program(s) to be executed, an identification of the input data and its various characteristics, task parameters, time constraints, etc. In the illustrated embodiment, the resource manager 180 also includes a timeout manager component 510 that is operable to determine the timeout duration 515 for a task as a function of the input data characteristics. Once the task begins executing on the provider network, a component such as the resource manager 180 may monitor the execution of the task to ensure that it does not exceed the timeout duration.

In various embodiments, the timeout duration 515 may be determined in a variety of ways. In one embodiment, the timeout manager 510 may determine the timeout duration 515 for a task based on resource usage data such as, for example, task execution history, resource utilization history, and overall resource usage trends for a given set of instances 130 that may be usable for the submitted task. For example, the timeout manager 510 may monitor repeated runs of a task over varying input data sizes. The timeout manager may then infer the appropriate relationship between the input data size and the execution duration for the task. Any suitable technique (e.g., curve fitting) may be used to determine the expected execution duration as a function of input data characteristic(s) for different runs of a particular task. In one embodiment, the relationship between the input data characteristic(s) and the execution duration may be determined to be linear. In one embodiment, machine learning techniques may be used to capture the relationship and provide future estimates. The relationship between the prior execution durations and the input data characteristic(s) for the task may be stored with the resource usage data in the resource management database 191. When a new task specification with a particular set of input data 505 is received, the timeout manager 510 may then determine an appropriate timeout duration 515 as a function of the characteristic(s) of the set of input data based on the resource usage data retrieved from the resource management database 191.

In one embodiment, the timeout manager 510 may determine the timeout duration 515 for a task by executing the task for a subset of the input data. For example, the time to execute the task for 5% of the input data may be determined by actually executing the task for those elements of input data after a new task specification with a particular set of input data 505 is received. To test the execution time for the subset of the input data, the same type of compute instances and other resources that will be used for the full set of input data may be used. Under the assumption that the input data set is substantially uniform, the expected execution time for the task may then be determined by multiplying the actual execution time for the 5% of the input data by twenty. In one embodiment, the execution time for the subset of the input data may be stored with the resource usage history in the resource management database 191.

In one embodiment, the client may specify a partial execution time per element or record in the input data set. The partial execution time may be stored as a default with a particular task that is executed on a regular basis. When a new task specification with a particular set of input data 505 is received, the timeout manager 510 may determine the estimated execution duration for the task by multiplying the per-element execution time by the size of the set of input data.

Once the expected execution time for the task has been determined, the timeout duration may be set appropriately. In one embodiment, the timeout duration may be set as a percentage (greater than 100%) of the expected execution time of the task for the entire input data set, e.g., 120% of the expected execution time. In one embodiment, the timeout duration may be set as one or two standard deviations above the expected execution time. In one embodiment, the timeout duration may be set as a sum of the expected execution time (e.g., two hours) and an additional fixed duration (e.g., thirty minutes). The timeout duration may be determined within a floor and/or a ceiling, i.e., minimum and maximum values. In one embodiment, the floor and ceiling values for the timeout duration may be specified or ratified by a user. In one embodiment, the timeout duration may be extended during periods of expected heavy resource usage.

In some embodiments, the timeout duration may vary based on the type of compute instances used for execution of the task. If the expected execution time for the task varies based on the instance pool used for the task, then the timeout duration for the task may be determined accordingly. In one embodiment, such variations in the instance pools may be included in the determination as part of the resource usage history.

In one embodiment, timeout durations may be determined as a function of data input characteristics for one or more subtasks of a task. The timeout durations may be determined for the subtasks using the same techniques described herein for tasks. In one embodiment, the timeout duration may be determined based on characteristics of one data type of a plurality of data types in the input data set. For example, if one data type is the largest and tends to dictate the execution time of the task, then the size of only that data type in the input data may be used in determining the expected execution time. In one embodiment, any suitable machine learning techniques may be used to create a statistical model of the relevance and impact of different data types in an input data set to the expected execution duration.

Figure 8:
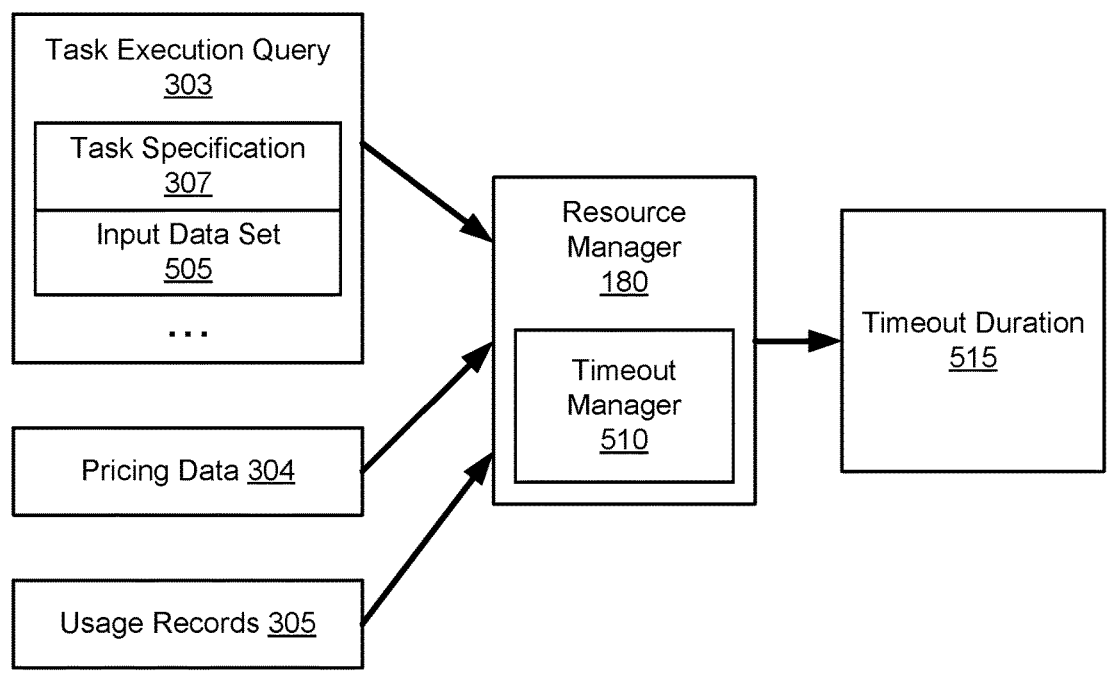
FIG. 8 illustrates an example of a set of data sources, including an input data characteristic, used by a resource management system to determine a timeout duration for a task, according to one embodiment.

FIG. 8 illustrates an example of a set of data sources, including an input data set having particular characteristics, used by a resource management system to determine a timeout duration for a task, according to one embodiment. As part of the task execution query 303 submitted by a client to define a task, a task specification 307 and a set of input data 505 may be provided to the resource manager 180. The task execution query may include additional elements of the task definition, as illustrated in FIG. 3. The task specification 307 may indicate various details of the task, e.g., whether the task is a compute task or a data transfer task, what programs or executables are to be used for the task, how the success of the task is to be determined, performance-related requirements (such as minimum CPU power, memory size, network bandwidth), and so on.

Based on the usage records 305, the resource manager 180 may be able to identify similarities between a client's previously executed tasks and the current task specification 307 in some embodiments, allowing the resource manager 180 to make more informed choices. For example, in one scenario, a task T1 may have been executed earlier on behalf of a given client using a resource instance R1 at an availability zone AZ1, and the initial estimates for the time it took to complete T1 were eventually found to be incorrect by 10%. If a new task execution query 303 for a task T2 is received from the same client, such that the task specification 307 for T2 is very similar to the task specification received earlier for T1, the resource manager 180 may be in a position to make a better estimate for how long it might take to complete T2, using records for the resources used by T1. In addition, the resource manager 180 may also decide to use similar resources at the same availability zone AZ1 that was used before, for example because the usage history data indicates that the similar task T1 completed successfully without any functional errors. More general resource usage data (i.e., data not specific to the requesting client) may also be useful in deciding the specific location and type of resources to be used for the current request. For example, the resource manager may schedule the new tasks at a more lightly-utilized availability zone than one that is extremely busy. Usage records 305 may be maintained in a repository such as resource management database 191 in some embodiments. In some implementations, the resource manager 180 may obtain current resource usage data from various monitoring agents distributed in the provider network, instead of or in addition to obtaining historical usage data from a repository.

Based on some or all of these sources of information and constraints, the timeout manager 510 may determine a timeout duration 515 for the task as a function of the input data characteristics for execution on one or more instance types or instance pools. The resource manager 180 may also select one or more compute instances (e.g., an instance pool) for execution of the task. The resource manager 180 may then oversee the execution of the task on the selected instance pool.

In one embodiment, the timeout duration may be monitored and/or modified after initiating the execution of the task. The resource manager 180 (or another suitable component of the resource management system 100) may monitor the progress of the task in comparison to the expected execution time. If the progress of the task is substantially slower than expected, then the timeout duration may be modified (i.e., lengthened) based on a difference between the estimated execution duration and the observed execution duration for a subset of the set of input data. For example, if 20% of the input data has actually been processed, then the expected execution duration for the entire set of input data may be determined by multiplying the actual execution time for the processed 20% of the input data by five. The timeout manager 510 may determine the modified timeout duration based on the modified estimated execution duration, as discussed above.

Figure 9:
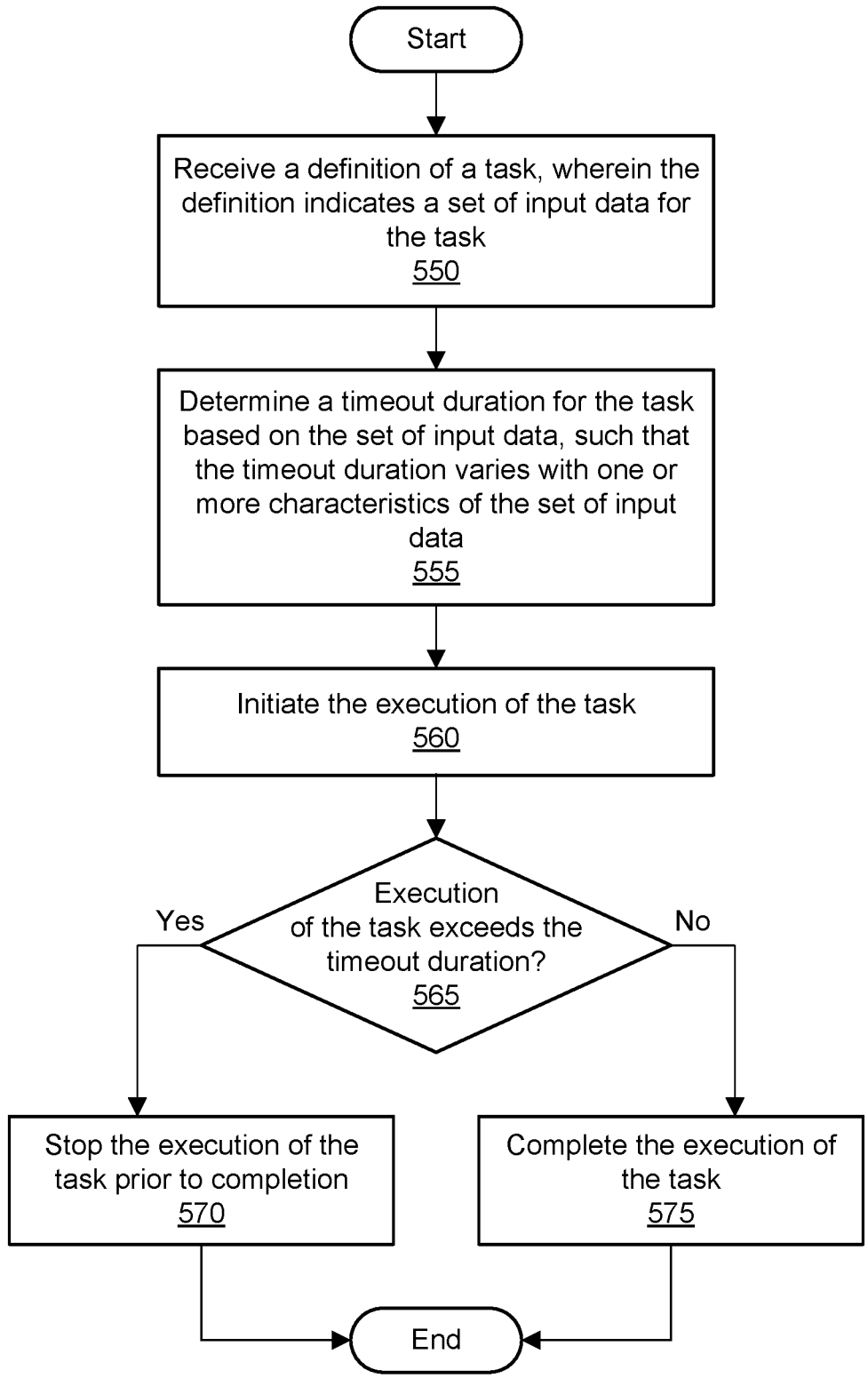
FIG. 9 is a flowchart illustrating a method for performing task timeouts based on input data characteristics, according to one embodiment.

FIG. 9 is a flowchart illustrating a method for performing task timeouts based on input data size, according to one embodiment. As shown in 550, a definition of a task may be received, wherein the definition of the task indicates a set of input data for the task. The definition of the task and the set of input data may include various characteristics of the task and/or input data, including the size of the input data, the size of a portion of the input data (e.g., one data type of multiple data types), the number of elements of input data, the number of iterations or processes (e.g., simulations) needed to process the input data completely, a parameter of the task, a client-supplied function or value that indicates the complexity or cost of the task, etc.

As shown in 555, a timeout duration for the task may be determined based on one or more characteristics of the set of input data, such that the timeout duration varies with the one or more characteristics. The timeout duration for the task indicates a duration at which the execution of the task should be stopped before the task has completed its execution. The timeout duration may be determined in a variety of different ways. In one embodiment, the timeout duration is determined based on execution of the same task using sets of additional input data that vary in a particular characteristic, such as the size of the input data. In one embodiment, the timeout duration for the task is determined as a function of an estimated duration for the execution of the task using the set of input data. In one embodiment, the timeout duration for the task is determined based on execution of the task using a subset of the set of input data or otherwise by sampling the input data to estimate the runtime duration or the output size. In one embodiment, the timeout duration is determined as a weighted combination of multiple elements, where one or more of the multiple elements is based on a characteristic of the input data. In one embodiment, the timeout duration is determined based on a runtime cost function or a runtime complexity function that is included in the set of input data or in the definition of the task. In one embodiment, the timeout duration is determined based on a combination of an estimated runtime duration plus an estimated duration of one or more preprocessing steps, such as cleaning or standardizing the input data, where the duration of the preprocessing steps may be estimated by sampling the input data.

As shown in 560, execution of the task may be initiated. The execution of the task may be monitored to ensure that it does not exceed the timeout duration. In one embodiment, the time taken to execute the task may be periodically checked. As shown in 565, it may be determined whether the execution of the task has exceeded the timeout duration. As shown in 570, if the timeout duration has been exceeded, then the execution of the task may be interrupted or otherwise stopped prior to completion. In one embodiment, execution of the task may be stopped only with user approval. The user approval may be received after the timeout duration has been exceeded (e.g., by prompting the user to cancel the task) or at the time of determining the timeout duration. As shown in 575, if the timeout duration has not been exceeded, then the execution of the task may be completed. In one embodiment, the monitoring operation shown in 565 may be performed repeatedly until the task has either completely executed or timed out.

In one embodiment, a threshold data processing rate may be determined instead of or in addition to a timeout duration. The threshold data processing rate may be determined such that data processing at a lesser rate will exceed the timeout duration over the entire input data set. For example, the threshold data processing rate may be determined by dividing the timeout duration by the number of data elements or records in the input data set. The progress of the task may be monitored, and the task may be stopped prematurely if the observed data processing rate is less than the threshold data processing rate. In one embodiment, the task may only be stopped due to a low data processing rate after a minimal amount of the input data set has been processed, e.g., 10%.

In one embodiment, the timeout duration may be based on a timeout function specified by the client along with the input data. The timeout function may be used to estimate the runtime duration, runtime cost, and/or runtime complexity. In one embodiment, a timeout function supplied by one client may be used for tasks submitted by other clients in a manner that protects the anonymity of the original client. The predictive value of the client-supplied timeout functions may be measured, and the timeout functions that most correctly predict the runtime duration, runtime cost, and/or runtime complexity may be used again for the same client or for other clients. Suitable timeout functions may be selected for new tasks based on a match of the task type and/or characteristics of the input data.

The timeout duration may be determined such that execution of the task satisfies a need-by time or other client-specified target. For example, the client may specify a need-by time, i.e., a time by which execution of the task is to be completed. The client may specify a not-need-by time, i.e., a time after which the result of the execution will not be needed (e.g., because the result would be too late to be useful). Additionally, the client may specify execution conditions such as cost bounds, timing bounds, etc. These elements may be specified along with the input data for the task, and the timeout duration may be determined accordingly.

Optimization of Task Execution

In some embodiments, using the systems and methods described herein, parameter values and/or computing resources for the execution of a task (e.g., configuration parameters for the resources) may be automatically selected to optimize a cost and/or a completion time for the execution of the task. As different iterations of similar tasks are performed, the performance characteristics of the tasks may be monitored and stored as task history data. When a new task is submitted by a client, the task history data may be used to automatically select an optimal configuration for execution of the new task. The optimal configuration may include parameter values relating to a cluster size, cluster composition, instance types, Hadoop configuration settings (e.g., a mapper/reducer ratio), and any other suitable parameters. In one embodiment, the parameter values may be selected to optimize (i.e., minimize) a cost of executing the task. In one embodiment, the parameter values may be selected to optimize (i.e., minimize) a completion time (i.e., execution duration) of the task. In one embodiment, both the cost and the completion time may be optimized.

Figure 10:
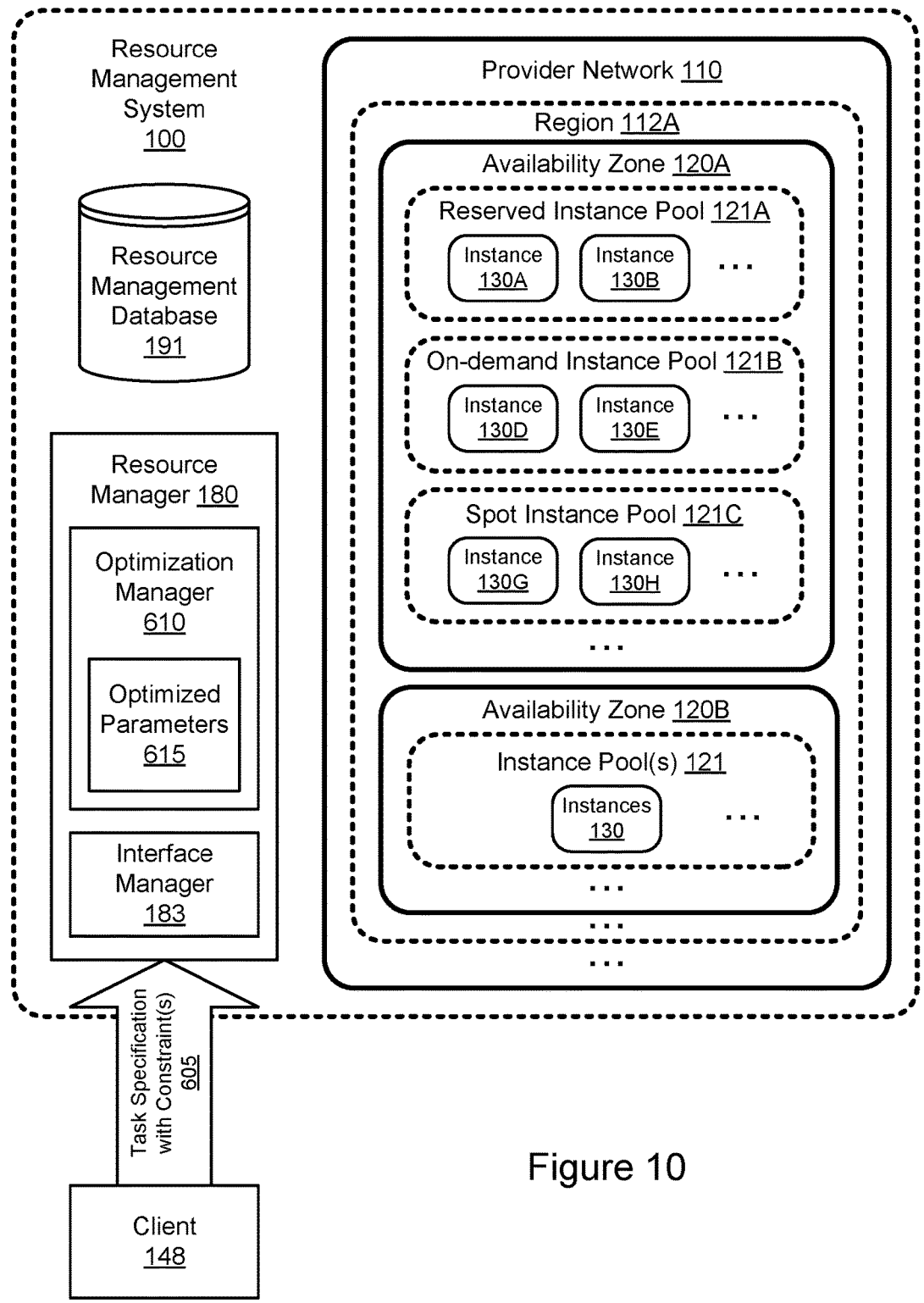
FIG. 10 illustrates an example system environment for a resource management system including dynamic cluster optimization, according to one embodiment.

FIG. 10 illustrates an example system environment for a resource management system including dynamic cluster optimization, according to one embodiment. As discussed above with respect to FIG. 1, the resource management system 100 includes a provider network 110 comprising a plurality of geographical regions such as region 112A. Additional geographical regions are not illustrated in FIG. 10. Each geographical region 112 may include one or more availability zones 120, such as availability zones 120A and 120B in region 112A. Each availability zone 120 may in turn include a plurality of resources such as resource instances 130A, 130B, 130D, 130E, 130G and 130H in availability zone 120A. The instances may be organized into various resource pools in some embodiments, such as reserved instance pool 121A, on-demand instance pool 121B, and spot instance pool 121C. The various resource instances 130 in the different availability zones 120 may be reserved and/or allocated for use by a client 148. Each instance pool 121 may have associated resource management and pricing policies, governing for example whether a reservation or allocation of a resource instance can be interrupted, whether reservations of one client can be resold to another, the different types of static and dynamic pricing rates in effect for instances of the pool, and so on.

In the illustrated embodiment, resource management system 100 includes a resource manager 180 operable to perform a variety of operations in response to requests submitted by a client 148. An interface manager component 183 of the resource manager 180 may, in some embodiments, implement one or more programmatic interfaces allowing a client 148 to submit a task specification (e.g., as part of a task execution query 303) with one or more constraints 605 for an optimization process. The task specification may supply the definition of a task to be scheduled, including an identification of the function(s) to be performed or program(s) to be executed, along with an indication of one or more constraints (e.g., cost and/or completion time) to be applied to an optimization process. In the illustrated embodiment, the resource manager 180 also includes an optimization manager component 610 that is operable to determine a set of one or more optimized parameters 615 for the submitted task, based on the constraint(s) 605. The optimization manager 610 may configure suitable resources (e.g., one or more instances 130) in the provider network 110 with the optimized parameters, and the task may then be executed using those resources in the optimized environment. Once the task begins executing on the provider network, a component such as the resource manager 180 may also monitor the execution of the task.

Figure 11:
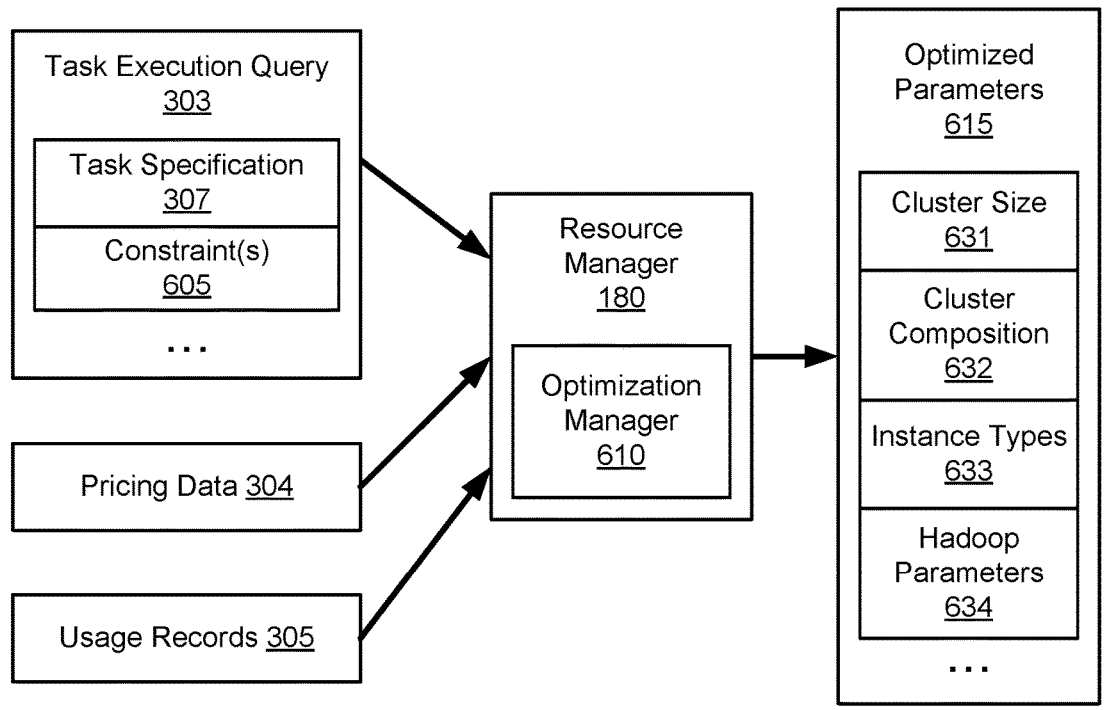
FIG. 11 illustrates an example of a set of data sources used by a resource management system to optimize the execution of a task, according to one embodiment.

FIG. 11 illustrates an example of a set of data sources used by a resource management system to optimize the execution of a task, according to one embodiment. As part of the task execution query 303 submitted by a client to define a task, a task specification 307 may be provided to the resource manager 180. The task execution query may include additional elements of the task definition, as illustrated in FIG. 3. The task specification 307 may indicate various details of the task, e.g., whether the task is a compute task or a data transfer task, what programs or executables are to be used for the task, how the success of the task is to be determined, performance-related requirements (such as minimum CPU power, memory size, network bandwidth), and so on.

The pricing data 304 used by the resource manager 180 may include the current pricing in effect for the various types of resources (such as on-demand or spot instances) at various locations of the provider network as well as past variations in such prices over time. In some embodiments, the resource manager 180 may develop a predictive model that projects pricing changes in the future, e.g., based on pricing variations in the past. Especially for long-lasting tasks and subtasks, the projections of future pricing based on past trends may be useful in determining the execution plans for the client's query. Resource usage records 305 for the requesting client 148 or for other clients, as well as overall resource utilization data for the various types of instances supported, may also be helpful in selecting the instance types and scheduled time for the submitted task.

Based on the usage records 305, the resource manager 180 may be able to identify similarities between a client's previously executed tasks and the current task specification 307 in some embodiments, allowing the resource manager 180 to make more informed choices. For example, in one scenario, a task T1 may have been executed earlier on behalf of a given client using a resource instance R1 at an availability zone AZ1, and the initial estimates for the time it took to complete T1 were eventually found to be incorrect by 10%. If a new task execution query 303 for a task T2 is received from the same client, such that the task specification 307 for T2 is very similar to the task specification received earlier for T1, the resource manager 180 may be in a position to make a better estimate for how long it might take to complete T2, using records for the resources used by T1. In addition, the resource manager 180 may also decide to use similar resources at the same availability zone AZ1 that was used before, for example because the usage history data indicates that the similar task T1 completed successfully without any functional errors. More general resource usage data (i.e., data not specific to the requesting client) may also be useful in deciding the specific location and type of resources to be used for the current request. For example, the resource manager may schedule the new tasks at a more lightly-utilized availability zone than one that is extremely busy. Projections for future resource utilizations may also be made based on past usage data, and may in some implementations be tied to projections of future pricing. Pricing data 304 and/or usage records 305 may be maintained in a repository such as resource management database 191 in some embodiments. In some implementations, the resource manager 180 may obtain current resource usage data from various monitoring agents distributed in the provider network, instead of or in addition to obtaining historical usage data from a repository.

The usage records 305 may comprise task history data collected for tasks that have been previously executed on the provider network 110. In various embodiments, the usage records 305 may comprise processor utilization data, memory utilization data, disk utilization data, etc., for tasks or subtasks. The task history data may be collected for tasks previously executed for the same client whose new task is sought to be optimized. In one embodiment, the task history data may also be collected from tasks previously executed on behalf of a plurality of clients across the provider network. For example, the task history for standard tasks may be collected and applied to the same tasks or similar tasks submitted by a different client. In this manner, the scope of the task history may be increased to provide for better tuning of the optimized parameters. In one embodiment, elements of the task history may be anonymized when applied from one client to another client. Elements of the usage records 305 may be collected in various ways. One or more processes involved in a task may be instrumented to collect relevant usage data. In one embodiment, usage data for the execution of a virtual machine may be monitored and collected by an external module (i.e., a module that is external to the virtual machine). In one embodiment, an agent may be executed inside the virtual machine and collect usage data internally.

The constraints 605 applied to the optimization process performed by the optimization manager 610 may vary, e.g., as decided by the client. In one embodiment, the user may select either cost or completion time as a constraint on the optimization process. In some embodiments, the user may elect to use both cost and completion time as constraints. When both constraints are used, the relative order of the cost constraint and the completion time constraint may be determined using any suitable user interface techniques or elements. For example, either the cost constraint or the completion time constraint may be selected as the primary constraint, and the remaining constraint may be a secondary constraint. In one embodiment, a slider bar in a graphical user interface (GUI) may receive user input to determine a relative contribution of the cost constraint and the completion time constraint, with one end of the slider bar indicating 100% cost constraint (and 0% completion time constraint) and the other end of the slider bar indicating 100% completion time constraint (and 0% cost constraint). Additional constraints may also be applied to the optimization process. For example, a constraint for the probability of success or failure of the task may be applied. As another example, a location constraint may be applied.

Based on some or all of these sources of information and constraints, the optimization manager 610 may determine a set of one or more optimized parameters 615 for execution of the task using appropriate resources of the provider network 110. The optimization manager 610 may use the selected constraint(s) 605 along with any other relevant data (e.g., usage records 305 and pricing data 304) to generate a solution to a constrained optimization problem. Any suitable technique for solving a constrained optimization problem may be used. In some embodiments, the optimized parameters 615 may relate to any selectable resource and/or any configurable element of the software or hardware in the provider network 110. For example, the optimized parameters 615 may include, but are not limited to, the following: cluster size 631, cluster composition 632, instance types 633, Hadoop configuration settings (e.g., a mapper/reducer ratio) 634, and any other suitable parameters. In one embodiment, optimized parameters may be generated for individual subtasks of a task in a similar manner.

The Hadoop settings may relate to a computing environment that supports data-intensive distributed applications based on the Hadoop software framework. The Hadoop environment may support the execution of applications on large clusters of commodity hardware while providing both reliability and data motion to applications. The Hadoop environment may implement a computational paradigm referred to as map/reduce, in which an application is divided into many small fragments which may be executed or re-executed on any node in the cluster. Accordingly, the ratio of mappers to reducers may be optimized for execution of a task in a Hadoop environment. The Hadoop environment may also provide a distributed file system that stores data on the compute nodes and provides very high aggregate bandwidth across the cluster.

In one embodiment, the task may correspond to one node in a graph that includes multiple nodes, each node representing a different task. The execution of a plurality of tasks in the graph may be optimized using the techniques described herein. The graph may comprise a dependency graph such that execution of at least one of the tasks is dependent on execution of at least one of the other tasks.

In one embodiment, the optimization manager 610 may use a learning phase to build appropriate historical data on which to base a properly optimized solution to the optimization problem. During the learning phase, the optimization manager 610 may instruct the resource manager 180 to run many tasks on the provider network 110, where the tasks have varying configurations. During the learning phase, the tasks may be executed on compute instances of different instance types in order to characterize the performance characteristics (e.g., in terms of completion time and/or cost) of the different instance pools. In this manner, the optimization manager 610 may build a model of the manner in which different parameter values affect the performance characteristics of different instance types. In one embodiment, the optimization manager 610 may use any suitable machine learning techniques to build the performance model. The results of the learning phase may be stored in the resource management database 191. The results (e.g., the performance model) may later be retrieved by the optimization manager 610 for optimizing the execution of a newly submitted task.

Figure 12:
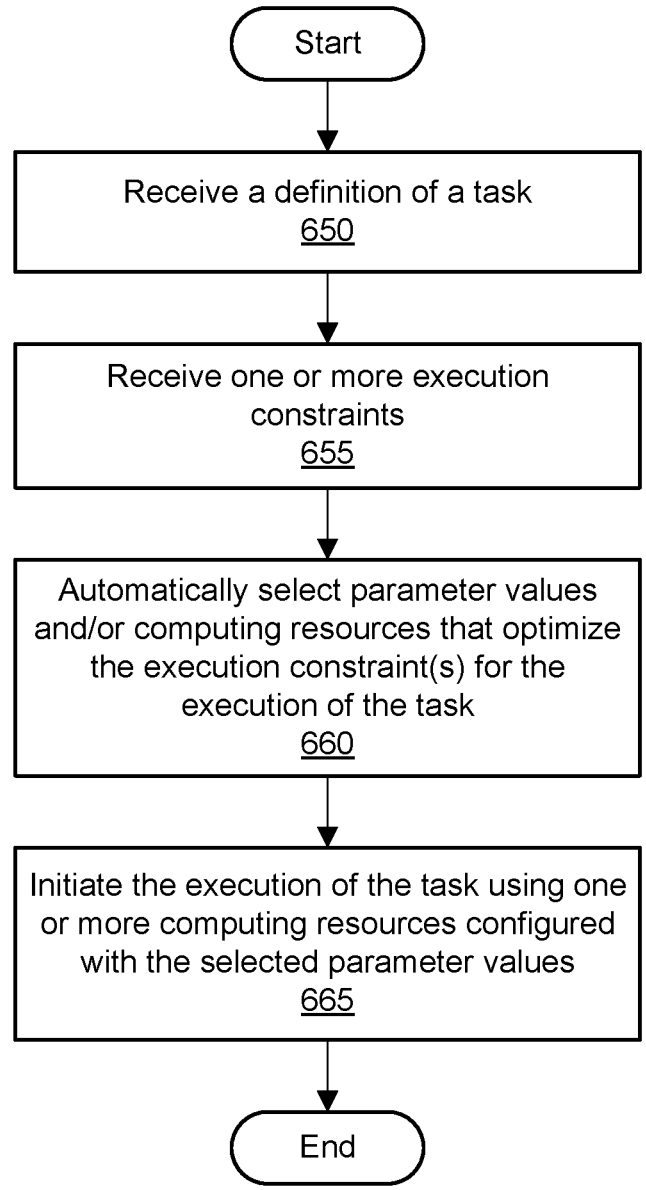
FIG. 12 is a flowchart illustrating a method for dynamic cluster optimization, according to one embodiment.

FIG. 12 is a flowchart illustrating a method for dynamic cluster optimization, according to one embodiment. As shown in 650, a definition of a task may be received. As shown in 655, one or more execution constraints may also be received, e.g., from a client. The execution constraints may include the cost of executing the task, the completion time for the execution of the task, the likelihood of success or failure of the task, or a combination of any such constraints. Additional constraints may also be received, such as a location constraint (e.g., one or more specific regions or availability zones in the provider network 110). If more than one constraint is specified, the constraints may be identified in a relative order, such that one constraint is a primary constraint, another constraint is a secondary constraint, etc.

As shown in 660, one or more parameter values and/or one or more computing resources for execution of the task may be automatically selected. The parameter values and/or computing resources may be automatically selected to optimize the one or more execution constraints for execution of the task. In this manner, a specific configuration of hardware and/or software elements of the provider network 110 may be selected for execution of the task in a manner that optimizes the selected constraint(s). The operation shown in 660 may generate a solution to a constrained optimization problem based on historical usage data, pricing data, etc., to match the task to an appropriate configuration. As shown in 665, the execution of the task may be initiated using one or more computing resources configured with the selected parameter values.

In one embodiment, the optimization process may employ data obtained from executing a plurality of additional tasks, where the parameter values vary for each of the plurality of additional tasks. The additional tasks may be tasks generated by the optimization manager 610 during a learning phase and/or tasks previously submitted by other users. Differences in performance among the plurality of additional tasks may be monitored. In the operation shown in 660, the plurality of parameter values may automatically selected for execution of the task based on the differences in performance among the plurality of additional tasks.

Configurable Workflow Service

In various embodiments, a data pipeline may provide one or more services allowing users to schedule and manage data-driven workflows. In some embodiments, the data pipeline may provide clients with access to functionality for creating, configuring, and executing defined workflows that manipulate source data in defined manners, such as under the control of a configurable workflow service that is available to multiple remote clients. In at least some embodiments, a remote client may interact with a configurable workflow service over one or more public networks in order to create and configure a defined workflow that is provided by the configurable workflow service for use by the client. Such a defined workflow may, for example, include multiple interconnected workflow components that are each configured to perform one or more specified types of data manipulation operations on a specified type of input data. After a client has configured such a defined workflow, the configurable workflow service may further execute the defined workflow at one or more times and in one or more manners, such as in some situations by provisioning multiple computing nodes provided by the configurable workflow service to each implement at least one of the workflow components for the defined workflow, and by retrieving defined types of source data and providing it to workflow components in defined manners. Thus, in at least some embodiments, some or all of the described techniques are automatically performed by embodiments of a configurable workflow service, such as may be implemented by one or more software modules executing on one or more configured computing systems, as described in greater detail below.

As noted above, a defined workflow may include multiple workflow components, which may be of multiple types in at least some embodiments, including one or more data source workflow components that correspond to input data for the defined workflow, one or more data manipulation workflow components that correspond to defined data transformations or other manipulations to be performed on data, and one or more data destination workflow components that correspond to providing output data from the defined workflow. In addition, interconnections may be defined between workflow components that correspond to data flows between workflow components, such that data output from a first component may be supplied as input to a second component, with that relationship being represented as a connection from the first component to the second component. In at least some embodiments and situations, the configurable workflow service may provide a group of predefined workflow components that a client may select and use in a defined workflow of the client, optionally after being configured in one or more manners. Furthermore, in at least some embodiments and situations, the configurable workflow service may enable a client to supply or otherwise define some or all workflow components to be used in a defined workflow of the client.

Each data source workflow component that is defined for a workflow may correspond to data obtained from an indicated data source, and may include information such as a storage location for the data and optionally additional access information related to the storage location (e.g., login information associated with the client, a particular search or other information to use to identify data to be used, such as metadata and/or data contents, etc.). In some embodiments, the configurable workflow service may provide internal storage locations for use by clients in storing their source data, with a particular data source corresponding to such an internal storage location, while in other embodiments and situations, a particular data source may be external to the configurable workflow service, such as one or more network-accessible storage systems that are provided by or otherwise controlled by the client, one or more online storage services, one or more online data generation services, etc. A non-exclusive list of examples of online storage services that may be used include the following: Amazon Simple Storage Service (S3) that stores object data of various types, Amazon Relational Database Service (RDS) that provides relational database functionality, Amazon SimpleDB that provides database functionality to store key-value pairs, Amazon DynamoDB service that provides NoSQL database functionality, Amazon Elastic Block Store (EBS) that provides access to raw block storage devices (e.g., mounting a virtual local block storage device on a target computer system), etc. A non-exclusive list of examples of online data generation services includes an RSS feed, the Amazon Cloudwatch Service that provides monitoring functionality for executing applications and services and generates corresponding information, etc. Data sources may thus be of various forms, such as a relational or other database (e.g., the HBase open-source distributed database, the BigTable distributed database, the MongoDB database system, the Apache Cassandra distributed database management system, etc.), a hash table, a file system, an object store, etc., optionally implemented in a distributed manner. A non-exclusive list of examples of data groups that may be obtained from a data source includes a file (e.g., a web server log), a database row or other record, a stored data object, a streamed group of data, etc.

Thus, in some situations and embodiments, a particular defined workflow may obtain and use data from multiple data sources, with some or all of the data sources optionally being external to the configurable workflow service. In addition, the configurable workflow service may optionally predefine one or more types of data source workflow components, such as to correspond to a particular internal storage mechanism of the configurable workflow service, to correspond to one or more particular online storage services (e.g., online storage services that are integrated with or otherwise affiliated with the configurable workflow service, or that instead are unaffiliated with the configurable workflow service), etc. Similarly, a client may optionally define one or more data source workflow components, such as to correspond to a client-specific storage location, to an online storage service without a predefined data source workflow component, etc.

Each data manipulation workflow component that is defined for a workflow may correspond to one or more defined data transformations or other manipulations on data that is input to the data manipulation workflow component. In addition, the output from a data manipulation workflow component may be provided to a data destination workflow component (and thus to be provided to a client), or instead may be intermediate data that is provided to a next data manipulation workflow component, such as via one or more electronic messages, by storing the intermediate data in a storage location accessible to the next data manipulation workflow component (e.g., using one or more storage locations provided by the configurable workflow service). Defined data manipulations may be of various forms, including a defined type of calculation on one or more groups of input data, aggregation of multiple groups of input data in one or more manners, selection of a subset of one or more groups of input data, moving data from one storage location to another, etc. A non-exclusive list of example data manipulations includes performing a distributed data copy, performing one or more SQL (Structured Query Language) transforms, performing one or more map and/or reduce functions within a map-reduce architecture (e.g., for use within the Amazon Elastic MapReduce service), using a scientific or mathematics package (e.g., MatLab, Mathematica, etc.), executing a client-supplied script or other program, etc.

Thus, in some situations and embodiments, a particular defined workflow may perform multiple data manipulation operations via multiple defined data manipulation workflow components, using predefined and/or client-defined data manipulation workflow components.

Each data destination workflow component that is defined for a workflow may correspond to output data provided from the defined workflow to one or more storage locations and in one or more manners. The types of storage locations used by data destination workflow components (and corresponding information stored for such data destination workflow components) may be similar to or the same as for data source workflow components in at least some embodiments, including storage locations that are internal to and/or external from the configurable workflow service. In addition, in at least some embodiments and situations, particular data destination workflow components may include operations to prepare and/or provide output data in a particular manner, such as by generating particular types of reports, by sending output data via one or more types of defined electronic communications, etc. Thus, in some situations and embodiments, a particular defined workflow may provide multiple types of output data in multiple manners via multiple defined data destination workflow components, using predefined and/or client-defined data destination workflow components.

In addition, a client may define a workflow in various manners in various embodiments. For example, an embodiment of a configurable workflow service may provide one or more interfaces for use by a client, such as a defined GUI ("graphical user interface"), a defined API ("application programming interface"), and/or a defined CLI ("command line interface"). When using a provided GUI, a user representative of a client may, for example, use a visual editor to specify particular workflow components for a workflow being defined, and may further specify interconnections between particular workflow components corresponding to data flows. In at least some such embodiments, the configurable workflow service may represent the defined workflow as a graph that logically represents the workflow, with various graph nodes corresponding to particular workflow components.

The configurable workflow service may further implement a defined workflow for a client in various manners and at various times. In some embodiments, each time that a defined workflow is to be used, the configurable workflow service instantiates a physical copy of the logical graph representing the defined workflow, such as by using multiple computing nodes that each implement at least one workflow component for the defined workflow. In particular, in at least some embodiments, some or all of the computing nodes are provisioned by the configurable workflow service to implement particular workflow components (e.g., to load corresponding software and/or data on those computing nodes), such as to each execute a workload worker process corresponding to each such implemented workflow component. The computing nodes may have various forms in at least some embodiments, including a separate physical computer system, a separate virtual machine (e.g., one of multiple virtual machines hosted on a physical computer system), a group of multiple physical computer systems that are operating in a distributed manner, etc. Some or all such computing nodes used for a defined workflow may in some embodiments be selected from a plurality of computing nodes provided by the configurable workflow service for use by clients. In addition, some or all such computing nodes may be provided by or otherwise controlled by the client and/or may be provided by one or more online execution services, whether instead of or in addition to computing nodes provided by the configurable workflow service. A non-exclusive list of example online execution services that may be used include the Amazon Elastic Compute Cloud ("EC2") program execution service, the Amazon Elastic MapReduce service for performing distributed map-reduce operations (e.g., by using a cluster of computing systems from the service to represent or implement a computing node for the configurable workflow service), etc. In addition, when a particular defined workflow is to be implemented multiple times, the configurable workflow service may in some embodiments maintain the provisioning and availability of some or all computing nodes for the defined workflow between two or more such times (e.g., in accordance with instructions from the client, based on an automated determination by the configurable workflow service, etc.). In other embodiments, the configurable workflow service may release some or all such computing nodes to be available after an implementation and provide the same types of provisioning of computing nodes (optionally different computing nodes) for a next implementation.

A defined workflow may further have additional types of associated information in at least some embodiments. For example, a client may specify information that indicates when to implement a defined workflow, e.g., based on a client instruction for immediate implementation, by scheduling future implementation at one or more defined future times, by scheduling one or more future implementations when one or more defined criteria are satisfied (e.g., based at least in part on availability of particular source data), etc. Defined criteria may be specified in various manners, such as criteria associated with particular workflow components or instead with the defined workflow as a whole. For example, a particular workflow component may have defined pre-condition criteria to be evaluated to determine when to execute the workflow component. Additionally, a particular workflow component may have defined post-condition criteria to be evaluated to determine when to complete execution and/or where to provide the output data (e.g., to a next workflow component, to an intermediate storage location, etc.). In some embodiments and situations, a defined workflow may further have one or more associated alarms that may be used to provide notification to a client (or to perform other activities) when one or more specified criteria are satisfied or are not satisfied (e.g., if a defined workflow is not implemented at a particular time, such as if particular source data is not available).

The configurable workflow service may further be a fee-based service in at least some embodiments, such that clients of the configurable workflow service are customers that pay fees to the provider of the configurable workflow service for at least some of the functionality provided by the configurable workflow service. In addition, when one or more online storage services and/or online execution services are used by the configurable workflow service as part of implementing a particular defined workflow for a particular client, the provider(s) of such other services may also optionally charge fees for such use, whether via the configurable workflow service or directly to the client.

Thus, use of the configurable workflow service in the data pipeline may provide various benefits in various embodiments, including enabling a client to schedule gathering data from multiple sources at particular times or otherwise when particular criteria are satisfied, performing defined types of data manipulation operations on the source data, and providing output data produced by the defined workflow in various manners. Additional benefits are discussed elsewhere herein, and will otherwise be appreciated by those skilled in the art.

In one embodiment, configurable workflow service ("CWS") workflows (also referred to as "pipelines") are defined via a configuration language that enables description of nodes (also referred to as "objects") that form a pipeline. In one embodiment, a pipeline may include objects from any of the following categories: Data Sources, Activities, Pre-Conditions and Post-Conditions, Schedules, and Alarms. In one embodiment, a Data Source is an input to or an output from a data manipulation workflow component (also referred to as an "activity" in this example embodiment).

In one embodiment, an Activity is an operation to be performed, such as data processing transformations, data copies, etc. Activities can be set to alarm on certain states and to retry multiple times on failure. In one embodiment, predefined activities may include Copy, SQLTransform, HiveQLTransform, ElasticMapReduceTransform, CommandLineTransform, and other suitable activities.

In one embodiment, a Pre-Condition or a Post-Condition is an action associated with a Data Source that evaluates to true when the Data Source is considered available and/or well formed. Pre-conditions that complete successfully enable a following Activity that consumes a Data Source as an input to be run. Post-conditions that complete successfully may enable an Activity that creates a Data Source to be considered successfully completed.

In one embodiment, a Schedule is an attribute of a Data Source that describes the periodicity of the data or an attribute of an Activity that defines the periodicity of when it runs. The periodicity can be at a granularity of one or more minutes, one or more hours, one or more days, one or more weeks, one or more months, etc.

In one embodiment, an Alarm describes a message to be published to a notification service (e.g., Amazon's SNS, or Simple Notification Service), sent via an electronic communication (e.g., e-mail), etc. Pipelines and individual Activities may have an Alarm defined for failure and/or success.

Users of the pipeline system may create pipelines as a basic resource. A pipeline includes one or more scheduled activities that execute a configurable number of times, e.g., ranging from once to every hour for an unbounded time period. On the backend, each of these activities may be implemented as an object definition based in Simple Workflow Service (SWF) that continually polls and, as necessary, creates SWF-based objects corresponding to individual scheduled executions representing of the object definition (aka the activity). Each object definition (and its associated scheduled execution) may require one or more actual SWF object executions because the pipeline system may automatically retry failures. All of these objects may have both SWF costs associated with their creation and DynamoDB (or other database) costs associated with their tracking. Execution may be performed by remote runners, also referred to herein as task runners: Java agents that poll the pipeline application programming interfaces (APIs) for work and then respond appropriately. This polling behavior has a non-zero cost to the pipeline system in the form of Dynamo operations used to track execution timeouts.

Additionally, the pipeline system may support control plane preconditions, e.g., data availability checks performed from its control plane. For these checks, both the polling behavior and the execution may be performed on a fleet of machines in the pipeline system's control plane. These preconditions may incur higher costs to EDP due to their requirement of hardware availability in the pipeline system's control plane. Additionally, some costs attributable to the pipeline system (e.g., webserver hardware to host the console, webservers to respond to customer API requests) will scale slowly with the number of objects and pipelines.

Figure 13:
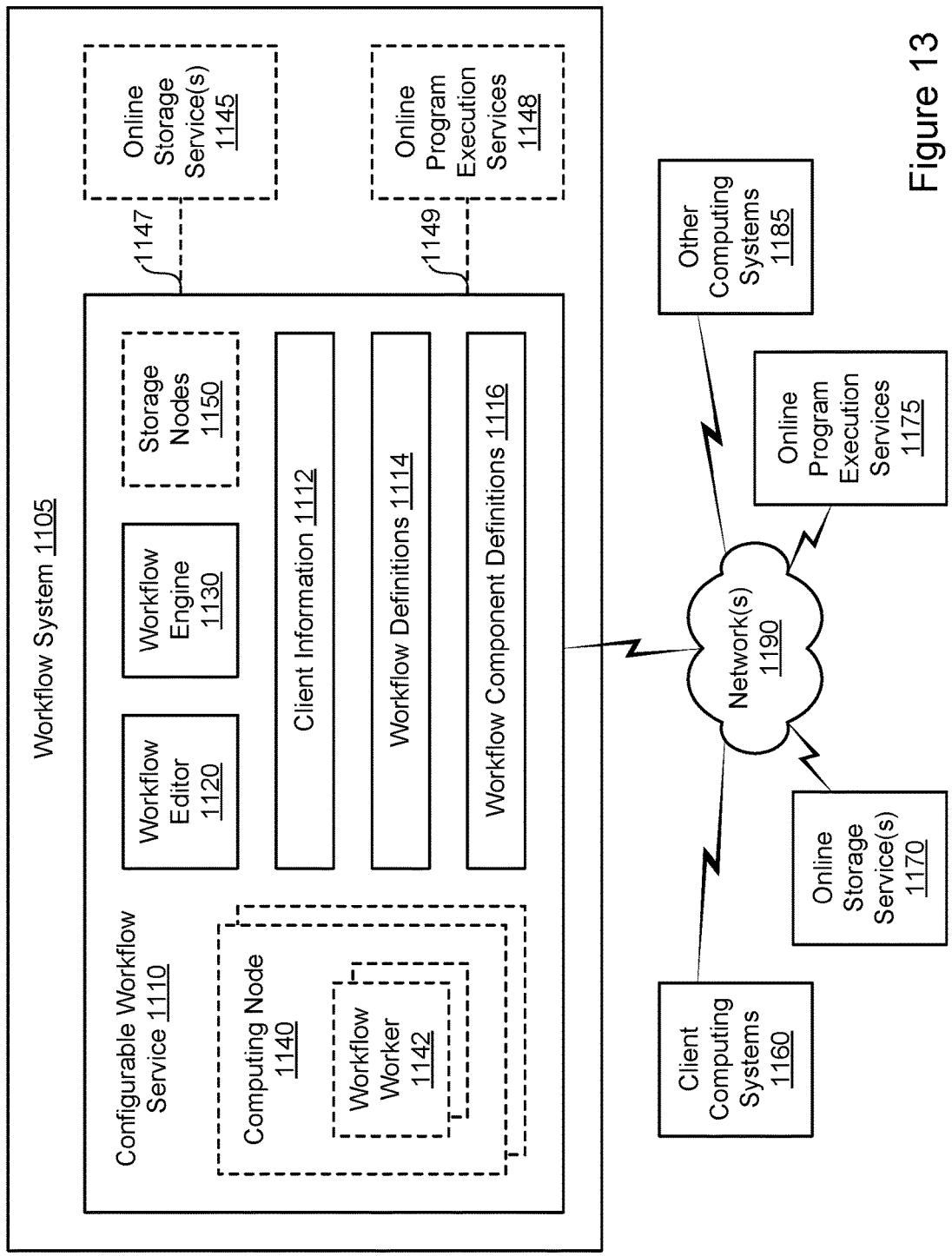
FIG. 13 illustrates an example embodiment of a configurable workflow service that provides functionality to enable remote clients to create, configure and execute defined workflows that manipulate source data in defined manners, according to one embodiment.

FIG. 13 is a network diagram that illustrates an example embodiment of a configurable workflow service 1110 that manages creation and execution of defined workflows for various clients of the configurable workflow service. As part of implementing a defined workflow, the configurable workflow service 1110 further provisions particular computing nodes to each perform specified activities corresponding to the defined workflow. In some embodiments, the configurable workflow service 1110 optionally provides a group of computing nodes 1140 on which defined workflows for clients may be executed. In other embodiments, some or all of the computing nodes used by the configurable workflow service may be provided externally to the configurable workflow service, such as by a client on whose behalf the defined workflow is implemented, by one or more online execution services, etc. In addition, in some embodiments, the configurable workflow service 1110 optionally includes one or more storage nodes 1150 on which data may be stored to facilitate the execution of defined workflows. For example, the storage nodes 1150, if present, may be used to store intermediate data results that are produced during execution of a defined workflow, and in some embodiments may further be used to store source data that is provided to a defined workflow and/or final output data produced by a defined workflow. While not illustrated in FIG. 13, the configurable workflow service may be implemented using one or more configured computing systems, as described in greater detail with respect to FIG. 14 and elsewhere.

FIG. 13 further illustrates one or more networks 1190, and various client computing systems 1160 via which clients of the configurable workflow service 1110 may interact with the service 1110 to define and execute workflows. The network(s) 1190 of FIG. 13 may include any appropriate network or combination of networks, including an intranet, the Internet, one or more private networks with access to and/or from the Internet, a cellular network, a local area network, or any other such network or combination thereof. Communications over the networks may be enabled by wired or wireless connections and combinations thereof.

In some embodiments, the configurable workflow service 1110 may provide one or both of a GUI (not shown) and/or an API (not shown), such as to enable clients to perform various interactions with the service 1110. For example, a user representative (not shown) of a particular client may locally interact with one of the client computing systems 1160 to cause further interactions to occur with the configurable workflow service 1110 over the network(s) 1190. The user may, for example, interact with a workflow editor module 1120 of the configurable workflow service, via which the user may define one or more workflows of interest for the client. As part of the interactions with the user, the configurable workflow service 1110 may store various client information 1112 regarding the client and optionally the user representative, and may store a particular definition of a newly defined workflow for the client as part of information 1114. In some embodiments, the defining of a particular workflow may include actions by the user in selecting one or more defined workflow components and specifying the interactions between those workflow components, such as by using one or more predefined system-provided workflow component definitions 1116. In other embodiments, the configurable workflow service 1110 may not provide any such system-provided predefined workflow components. As part of defining a new workflow, the user may further specify one or more source locations at which source data is to be retrieved and used for the workflow definition, and one or more destination locations to which data that is produced by the defined workflow will be provided. The various information 1112, 1114, and 1116 used by the configurable workflow service 1110 may further be stored on one or more systems that support or provide the configurable workflow service 110, such as a database of the configurable workflow service, although such systems are not illustrated with respect to FIG. 13.

In addition, the user representative of the client may optionally in some embodiments define one or more new workflow components as part of defining a new workflow, and if so, such client-defined workflow components may further have definition information stored in information 1116 in at least some embodiments. While a client-defined workflow and any client-defined workflow components may in some embodiments be treated as private unless otherwise specified by the client (e.g., to be accessible or otherwise visible only to that client unless other specified), in other embodiments and situations, at least some such client-specific information may instead be made available to other clients in specified circumstances, such as to enable other clients to use some or all of the client's defined workflow components and/or workflows (e.g., for a fee or for other benefits provided to the client who defined such information, if the client who defined such information approves use by others, etc.). In a similar manner, source data used by a client's defined workflow and final output data produced by a client's defined workflow may in at least some embodiments be treated as private to that client unless otherwise specified, although in other embodiments some or all such source data and/or final output data may instead be made available to other clients in specified circumstances (e.g., for a fee or for other benefit to the client with which that data is associated, if the client associated with such information approves use by others, etc.).

When a client indicates one or more storage locations from which source data may be obtained and/or to which final output data may be provided for a defined workflow, such storage locations may have various forms in various embodiments, as discussed in greater detail elsewhere. As one example, in at least some embodiments, the configurable workflow service may be integrated with or otherwise affiliated with one or more particular optional online storage services 1145, such as to form a single system 1105 (e.g., a single system that is operated by a single entity). If so, interactions 1147 with such optional online storage services 1145 may be performed to retrieve source data and/or to store final output data. Furthermore, in at least some embodiment, intermediate data results that are generated during execution of a workflow may similarly be stored in such online storage services 1145, such as to be produced by a first part of the defined workflow and to be later accessed and used by a second defined part of the workflow, whether in addition to or instead of one or more optional storage nodes 1150. Moreover, in at least some embodiments and situations, one or more online storage services 1170 are available over the network 1190 to the client computing system 1160 and to the configurable workflow service 1110, and may be used in a similar manner over the network(s) 1190, whether in addition to or instead of some or all of the optional online storage services 1145. In addition, in at least some embodiments and situations, a particular client may provide one or more client-specific storage systems or other storage locations using one or more other computing systems 1185, which may similarly be used over the network(s) 1190.

After a client has interacted with the configurable workflow service to define a workflow, the client may further interact with a workflow engine module 1130 of the configurable workflow service to initiate execution of the defined workflow. The execution of a particular workflow may be initiated in various manners, such as to be performed immediately upon a corresponding instruction from the client, to occur at a specified future time or when other specified criteria (such as for one or more defined preconditions) are satisfied that will initiate execution of the workflow, etc. As with the workflow editor module 1120, the workflow engine module 1130 may in some embodiments provide a GUI interface and/or and API interface for use by clients. When the execution of a defined workflow is initiated, the workflow engine module 1130 in the example embodiment retrieves workflow definition information for that defined workflow from the information 1114, and initiates the execution of the defined workflow on one or more computing nodes. In particular, the workflow definition may be constructed with various logical nodes that each correspond to defined operations and are interconnected in various manners, and the workflow engine module 1130 may select particular computing nodes to use to perform particular such operations, as well as to further perform activities to provision and initiate execution of corresponding workflow worker processes on each such selected computing node. As part of provisioning such computing nodes and/or of executing workflow worker processes on the computing nodes, additional interactions with one or more storage locations may be performed to obtain input data to be used and/or to store results data that are produced, including for intermediate results data for use by other workflow worker processes of the defined workflow.

Some or all of the computing nodes used to implement a defined workflow may, for example, be selected from optional computing nodes 1140 provided by the configurable workflow service 1110, if present, and workflow worker processes 1142 may be executed on those computing nodes to implement the defined operations. In other embodiments, the workflow engine module 1130 may use computing nodes that are not provided by the configurable workflow surface 1110, whether instead of or in addition to the optional computing nodes 1140. For example, in some embodiments and situations, a particular client may provide or otherwise control one or more other computing systems 1185, and the workflow engine 1130 may configure and use such other computing systems 1185 as computing nodes for use in executing that client's defined workflow. In addition, in some embodiments, one or more online program execution services 1148 and/or 1175 may be available for use in executing programs in various manners, and if so may be used to provide computing nodes (not shown) to execute some or all of a particular client's defined workflow. For example, the workflow engine module 1130 may provision and initiate execution of particular workflow worker processes on particular computing nodes provided by such online program execution services. As one example, in at least some embodiments, the configurable workflow service may be integrated with or otherwise affiliated with one or more particular optional online program execution services 1148 (whether in addition to or instead of one or more optional storage services 1145), such as part of a single system 1105 as described above. If so, interactions 1149 with such optional online program execution services 1148 may be performed to provision computing nodes, initiate execution of particular workflow components, receive output data produced by particular workflow components, etc.

In other embodiments, the configurable workflow service 1110 may perform additional techniques, such as to generate and provide particular types of source data for defined workflows, to perform additional activities with respect to managing final output data produced by clients' defined workflows, etc. In addition, the configurable workflow service 1110 may be implemented in some embodiments based on software instructions that execute on one or more server computing systems to program or otherwise configure the server computing system(s) to perform some or all of the described techniques, such as to program one or more hardware CPU processors (not shown) of the server computing system(s). Such software instructions may, for example, be used to implement the modules 1120 and/or 1130, or instead the functionality of the configurable workflow service may be provided using other types of modules.

In this manner, the configurable workflow service 1110 provides various benefits to various external clients, including to enable the clients to define workflows that may be executed using computing and storage resources of the configurable workflow service 1110 in part or in whole, to interact with various types of online data sources to obtain data to be manipulated, and to provide output data that is produced for storage or other use. Additional details related to particular operations of the configurable workflow service 1110 are included elsewhere herein.

Although the foregoing example embodiment of FIG. 13 is described with respect to a configurable workflow service 1110 that provides various types of functionality in conjunction with one or more client systems that each may have one or more associated users, it will be appreciated that various other embodiments may exist. For example, in at least some embodiments and situations, a client may represent an organization or other group (e.g., a company that has multiple people instead of an individual person). Thus, a client entity may have various forms in various embodiments.

In some embodiments, the configurable workflow service 1110 and optionally any online storage services and/or online program execution services that are used may each operate according to one or more fee-based structures or agreements. For example, access to some or all of the described techniques from the configurable workflow service 1110 may in some embodiments be provided in a fee-based or other paid manner to a provider or operator of the configurable workflow service 1110 and/or to at least some client systems that use described techniques of the configurable workflow service 1110. As one example, clients of the configurable workflow service 1110 may pay one-time fees, periodic (e.g., monthly) fees, and/or one or more types of usage-based fees to use functionality provided by the configurable workflow service 1110. Such fees may be based on one or more factors and activities, such as indicated in the following non-exclusive list: based on a quantity and/or type of interactions performed to define a particular workflow; a size and/or type of a defined workflow and/or of some or all of its defined workflow components; based on usage of a defined workflow, such as a measure of computing resources used in executing a defined workflow (e.g., a quantity of computing nodes used), a measure of processor capability used (e.g., CPU cycles), an amount of time that occurs during the execution of the defined workflow, activities in provisioning computing nodes for a defined workflow, amount of time during which computing nodes that are provisioned for a defined workflow are unavailable for other use, such as while those computing nodes wait for source data to be available or other preconditions to be satisfied, based on a quantity of data that is stored and/or transferred, such as based on a size of the data, an amount of time of the storage, etc.; based on content or other characteristics of particular data groups that are stored, manipulated and/or produced; etc.

Illustrative Computer System

Figure 14:
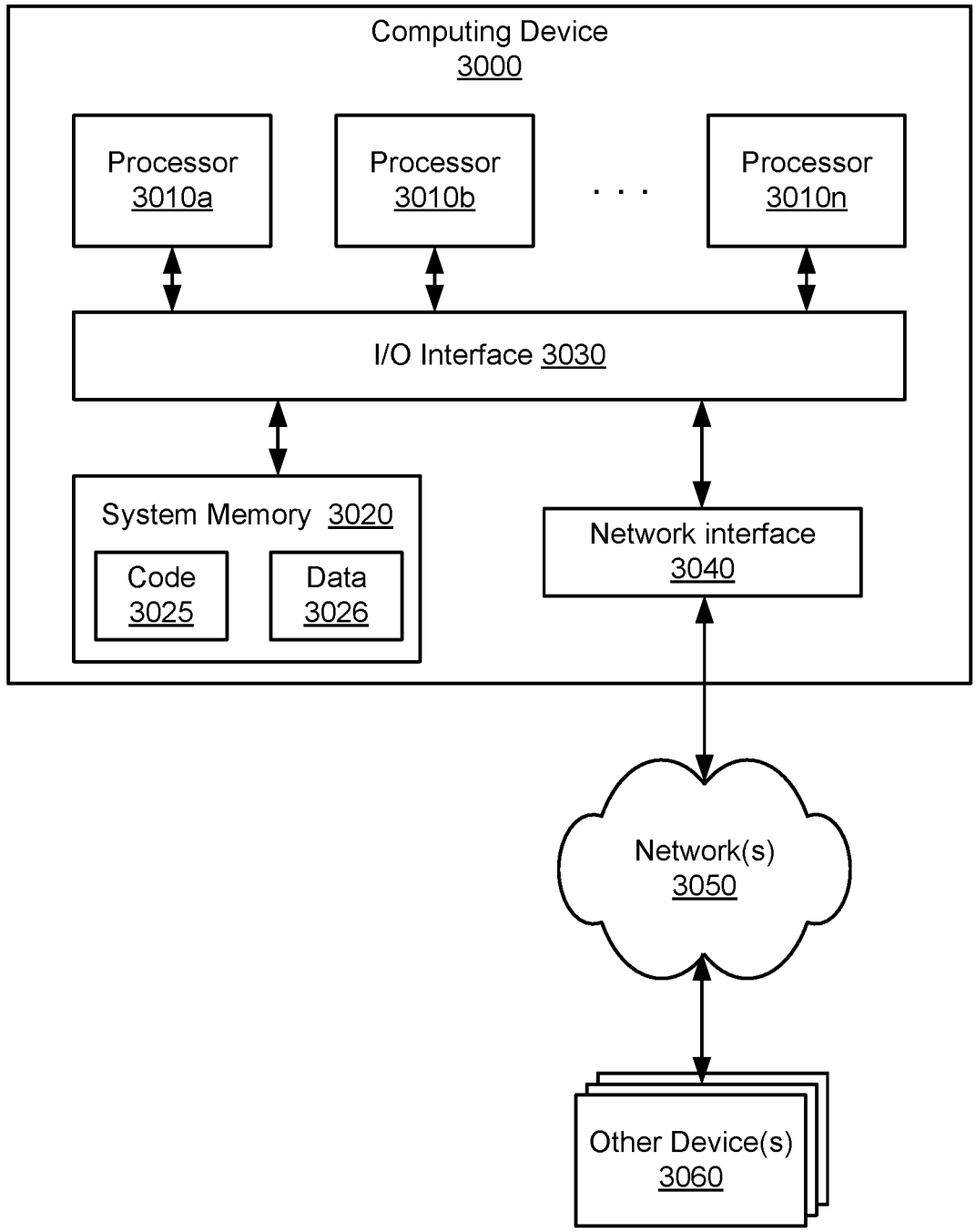
FIG. 14 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 14 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a plurality of computing devices configured to implement a plurality of computing resources of a provider network; and
    one or more computing devices configured to implement a resource manager, wherein the resource manager is configured to:
        receive a task specification;
        select at least one parameter value and one or more of the plurality of computing resources for execution of the task based on an execution history for a plurality of prior tasks performed for a plurality of clients, wherein to select the at least one parameter value, the resource manager is configured to:
            monitor differences in execution for the plurality of prior tasks, wherein the at least one parameter value varies for at least several of the plurality of prior tasks; and
            determine the at least one parameter value for the execution of the task based at least in part on the differences in execution among the plurality of prior tasks;
        configure the selected one or more computing resources with the selected at least one parameter value; and
        initiate the execution of the task using the selected one or more computing resources configured with the at least one selected parameter value.

2. The system as recited in claim 1, wherein the resource manager is further configured to:
    execute a plurality of additional tasks, wherein the at least one parameter value varies for at least several of the plurality of additional tasks; and
    monitor differences in execution among the plurality of additional tasks;
    wherein the at least one parameter value and the one or more computing resources are selected for the execution of the task based on the differences in execution among the plurality of additional tasks.

3. The system as recited in claim 1, wherein the selected at least one parameter value and the selected one or more computing resources optimize a cost of the execution of the task as a primary constraint and a completion time as a secondary constraint, or wherein the selected at least one parameter value and the selected one or more computing resources optimize the completion time as the primary constraint and the cost of the execution of the task as the secondary constraint.

4. The system as recited in claim 1, wherein the selected at least one parameter value comprises an indication of a cluster size or a cluster composition.

5. The system as recited in claim 1, wherein the selected at least one parameter value optimizes a cost of the execution of the task and/or a completion time of the execution of the task.

6. The system as recited in claim 1, wherein the selected at least one parameter value optimizes one or more execution constraints for the execution of the task and one or more additional tasks.

7. A computer-implemented method, comprising:
receiving a definition of a task;
selecting at least one parameter value for execution of the task based on an execution history for a plurality of prior tasks performed for a plurality of clients, said selecting comprising:
monitoring differences in execution for the plurality of prior tasks, wherein the at least one parameter value varies for at least several of the plurality of prior tasks; and
determining the at least one parameter value for the execution of the task based at least in part on the differences in execution among the plurality of prior tasks; and
initiating the execution of the task using one or more computing resources configured with the at least one selected parameter value.

8. The method as recited in claim 7, wherein the selected at least one parameter value optimizes one or more execution constraints, wherein the one or more execution constraints comprise a cost of the execution of the task and/or a completion time of the execution of the task.

9. The method as recited in claim 7, wherein the selected at least one parameter value optimizes one or more execution constraints for the execution of the task and one or more additional tasks.

10. The method as recited in claim 7, wherein at least one of the at least one parameter value comprises an indication of a cluster size or a cluster composition.

11. The method as recited in claim 7, wherein at least one of the at least one parameter value comprises an indication of an instance type for a compute instance.

12. The method as recited in claim 7, wherein at least one of the at least one parameter value comprises a ratio of mappers to reducers in a Hadoop cluster.

13. The method as recited in claim 7, wherein the at least one parameter value is selected using a constrained optimization process having a plurality of execution constraints, wherein at least one of the plurality of execution constraints comprises a successful completion of the execution of the task.

14. The method as recited in claim 7, wherein the selected at least one parameter value optimizes a cost of the execution as a primary constraint and a completion time as a secondary constraint, or wherein the at least one parameter value optimizes the completion time as the primary constraint and the cost as the secondary constraint.

15. A system, comprising:
at least one processor;
a memory coupled to the at least one processor, wherein the memory stores program instructions, wherein the program instructions are executable by the at least one processor to:
receive a definition of a task;
select at least one parameter value for execution of the task based on an execution history for a plurality of prior tasks performed for a plurality of clients, wherein to select the at least one parameter value, the program instructions are executable by the at least one processor to:
monitor differences in execution for the plurality of prior tasks, wherein the at least one parameter value varies for at least several of the plurality of prior tasks; and
determine the at least one parameter value for the execution of the task based at least in part on the differences in execution among the plurality of prior tasks; and
initiate the execution of the task using one or more selected computing resources configured with the selected parameter values.

16. The system as recited in claim 15, wherein the plurality of additional tasks comprise tasks submitted by a first client and a second client.

17. The system as recited in claim 15, wherein the selected at least one parameter value optimizes a cost of the execution as a primary constraint and the completion time as a secondary constraint, or wherein the selected at least one parameter value optimizes the completion time as the primary constraint and the cost as the secondary constraint.

18. The system as recited in claim 15, wherein selected at least one parameter value optimizes a successful completion of the execution of the task.

19. The system as recited in claim 15, wherein at least one of the at least one parameter value comprises an indication of a cluster size or a cluster composition.

20. The system as recited in claim 15, wherein the at least one parameter value is selected using a constrained optimization process having a plurality of constraints.

21. The method of claim 7, further comprising:
executing a plurality of additional tasks, wherein the at least one parameter value varies for at least several of the plurality of additional tasks; and
monitoring differences in execution among the plurality of additional tasks;
wherein the one or more selected computing resources are selected for the execution of the task based at least in part on the differences in execution among the plurality of additional tasks.

22. The system of claim 15, wherein the program instructions include instructions executable by the at least one processor to:
execute a plurality of additional tasks, wherein the at least one parameter value varies for at least several of the plurality of additional tasks; and
monitor differences in execution among the plurality of additional tasks;
wherein the one or more selected computing resources are selected for the execution of the task based at least in part on the differences in execution among the plurality of additional tasks.

* * * * *